(12) United States Patent
Yamanaka et al.

(10) Patent No.: US 11,508,976 B2
(45) Date of Patent: Nov. 22, 2022

(54) FUEL CELL SYSTEM

(71) Applicant: TOYOTA JIDOSHA KABUSHIKI KAISHA, Toyota (JP)

(72) Inventors: Tomio Yamanaka, Nagoya (JP); Tomotaka Ishikawa, Nagoya (JP); Tomohiro Ogawa, Miyoshi (JP); Ryosuke Oya, Toyota (JP); Junichi Matsuo, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 256 days.

(21) Appl. No.: 16/516,617

(22) Filed: Jul. 19, 2019

(65) Prior Publication Data
US 2020/0036018 A1 Jan. 30, 2020

(30) Foreign Application Priority Data
Jul. 26, 2018 (JP) .............................. JP2018-140485

(51) Int. Cl.
*H01M 8/04* (2016.01)
*H01M 8/04223* (2016.01)
(Continued)

(52) U.S. Cl.
CPC ..... *H01M 8/04253* (2013.01); *H01M 8/0432* (2013.01); *H01M 8/04097* (2013.01);
(Continued)

(58) Field of Classification Search
CPC ......... H01M 8/04253; H01M 8/04225; H01M 8/04302; H01M 8/04097; H01M 8/04111;
(Continued)

(56) References Cited

U.S. PATENT DOCUMENTS

| | | | | |
|---|---|---|---|---|
| 2005/0100768 A1* | 5/2005 | Ueda | ................ | H01M 8/04761 429/427 |
| 2009/0087699 A1* | 4/2009 | Takemoto | ......... | H01M 8/04223 429/423 |

(Continued)

FOREIGN PATENT DOCUMENTS

| | | |
|---|---|---|
| CN | 105633432 A | 6/2016 |
| CN | 105633432 B | 9/2018 |

(Continued)

*Primary Examiner* — Amanda C. Walke
(74) *Attorney, Agent, or Firm* — Dickinson Wright, PLLC

(57) ABSTRACT

A fuel cell system includes a fuel cell, an anode gas supply system, an anode gas circulatory system, a cathode gas supply-discharge system, a gas-liquid discharge passage, a gas-liquid discharge valve configured to open and close the gas-liquid discharge passage, a flow-rate acquisition portion, and a controlling portion. After the controlling portion instructs the gas-liquid discharge valve to be opened, the controlling portion executes a normal-abnormality determination such that, when a discharge-gas flow rate of anode gas is a predetermined normal reference value or more, the controlling portion determines that the gas-liquid discharge valve is opened normally, and when the discharge-gas flow rate is lower than the normal reference value, the controlling portion determines that the gas-liquid discharge valve is not opened normally.

5 Claims, 11 Drawing Sheets

(51) Int. Cl.
*H01M 8/04082* (2016.01)
*H01M 8/0438* (2016.01)
*H01M 8/04089* (2016.01)
*H01M 8/04664* (2016.01)
*H01M 8/0432* (2016.01)
*H01M 8/04858* (2016.01)
*H01M 8/04225* (2016.01)
*H01M 8/04746* (2016.01)
*H01M 8/04111* (2016.01)
*H01M 8/04492* (2016.01)
*H01M 8/04302* (2016.01)

(52) U.S. Cl.
CPC .... *H01M 8/04111* (2013.01); *H01M 8/04201* (2013.01); *H01M 8/04225* (2016.02); *H01M 8/04302* (2016.02); *H01M 8/04402* (2013.01); *H01M 8/04492* (2013.01); *H01M 8/04686* (2013.01); *H01M 8/04753* (2013.01); *H01M 8/04776* (2013.01); *H01M 8/04902* (2013.01)

(58) Field of Classification Search
CPC ........... H01M 8/04201; H01M 8/0432; H01M 8/04402; H01M 8/04492; H01M 8/04686; H01M 8/04753; H01M 8/04776; H01M 8/04902; H01M 8/04119; H01M 8/04104

See application file for complete search history.

(56) References Cited

U.S. PATENT DOCUMENTS

| | | | |
|---|---|---|---|
| 2010/0190080 A1* | 7/2010 | Hasuka | H01M 8/04097 |
| | | | 429/446 |
| 2011/0212371 A1* | 9/2011 | Itoga | H01M 8/04164 |
| | | | 429/414 |
| 2016/0141650 A1 | 5/2016 | Maruo et al. | |
| 2017/0179511 A1* | 6/2017 | Jung | H01M 8/04686 |
| 2017/0214069 A1* | 7/2017 | Hoshi | H01M 8/04067 |
| 2017/0256806 A1 | 9/2017 | Ogawa et al. | |

FOREIGN PATENT DOCUMENTS

| | | |
|---|---|---|
| JP | 2008059974 A | 3/2008 |
| JP | 2011003465 A | 1/2011 |
| JP | 2013179064 A | 9/2013 |
| JP | 2016096081 A | 5/2016 |
| JP | 2017157512 A | 9/2017 |

* cited by examiner

FUEL CELL SYSTEM

INCORPORATION BY REFERENCE

The disclosure of Japanese Patent Application No. 2018-140485 filed on Jul. 26, 2018 including the specification, drawings and abstract is incorporated herein by reference in its entirety.

BACKGROUND

1. Technical Field

This disclosure relates to a technology of a fuel cell system.

2. Description of Related Art

In the related art, there has been known a technology in which a gas-liquid discharge valve is placed in a fuel cell system, and the gas-liquid discharge valve is configured to discharge, to the outside, impurity gas such as nitrogen gas included in anode offgas discharged from a fuel cell and liquid water generated by power generation of the fuel cell (Japanese Unexamined Patent Application Publication No. 2008-59974 (JP 2008-59974 A).

SUMMARY

In the related art, when a temperature of the gas-liquid discharge valve is a defrosting temperature or more, it is determined that the gas-liquid discharge valve can be opened normally. However, even when the temperature of the gas-liquid discharge valve is the defrosting temperature or more, the gas-liquid discharge valve might not be opened normally in some cases. For example, in a case where foreign matter such as dust is caught in the gas-liquid discharge valve, even when the temperature of the gas-liquid discharge valve is the defrosting temperature or more, a normal valve open state might not be obtained in some cases. Also, for example, in a case where the foreign matter is ice, even when the temperature of the gas-liquid discharge valve is the defrosting temperature or more, the ice does not melt completely so that a normal valve opening operation might not be performed. Accordingly, the determination based on the temperature of the gas-liquid discharge valve has a problem that a determination on whether the gas-liquid discharge valve is opened normally or not cannot be executed accurately.

This disclosure is achievable in the following aspects.

One aspect of this disclosure provides a fuel cell system. The fuel cell system includes a fuel cell, an anode gas supply system, an anode gas circulatory system, a cathode gas supply-discharge system, a gas-liquid discharge passage, a gas-liquid discharge valve, a flow-rate acquisition portion, and a controlling portion. The anode gas supply system is configured to supply anode gas to the fuel cell. The anode gas supply system includes an anode gas supply passage through which the anode gas flows toward the fuel cell. The anode gas circulatory system is configured to circulate anode offgas discharged from the fuel cell to the anode gas supply passage. The anode gas circulatory system includes: an anode gas circulation passage through which the anode offgas flows toward the anode gas supply passage; and a gas-liquid separator provided in the anode gas circulation passage and configured to separate liquid water from the anode offgas. The cathode gas supply-discharge system includes: a cathode gas supply passage configured to supply cathode gas to the fuel cell; and a cathode gas discharge passage through which cathode offgas discharged from the fuel cell is discharged to an outside of the fuel cell system. The gas-liquid discharge passage is connected to the gas-liquid separator. The gas-liquid discharge valve is provided in the gas-liquid discharge passage and is configured to open and close the gas-liquid discharge passage. The flow-rate acquisition portion is configured to acquire a discharge-gas flow rate of the anode offgas discharged from the gas-liquid discharge valve. The controlling portion is configured to execute an operation determination process including a normal-abnormality determination on whether the gas-liquid discharge valve is opened normally or not. After the controlling portion instructs the gas-liquid discharge valve to be opened, the controlling portion executes the normal-abnormality determination such that, when the discharge-gas flow rate of the anode offgas is a predetermined normal reference value or more, the controlling portion determines that the gas-liquid discharge valve is opened normally, and when the discharge-gas flow rate of the anode offgas is lower than the predetermined normal reference value, the controlling portion determines that the gas-liquid discharge valve is not opened normally.

With this aspect, by executing the normal-abnormality determination on the gas-liquid discharge valve by use of the discharge-gas flow rate, it is possible to accurately perform the normal-abnormality determination on whether or not the gas-liquid discharge valve is opened normally. For example, it is possible to accurately determine a case where the gas-liquid discharge valve does not operate normally for a reason other than freezing. Further, for example, by performing the normal-abnormality determination by use of the discharge-gas flow rate, it is possible to accurately perform the normal-abnormality determination, even when the gas-liquid discharge valve is not opened normally due to freezing.

In the above aspect, the fuel cell system may further include a temperature acquisition portion configured to acquire an environmental temperature of the fuel cell system. In a case where the controlling portion receives an activation instruction to activate the fuel cell system, when the environmental temperature is a freezing point or less, the controlling portion may execute a below-freezing starting process by controlling the anode gas supply system to supply the anode gas to the fuel cell and instructing the gas-liquid discharge valve to be opened. After the controlling portion instructs the gas-liquid discharge valve to be opened in the below-freezing starting process, the controlling portion may execute the normal-abnormality determination.

With this aspect, the normal-abnormality determination can be executed by use of the below-freezing starting process.

In the above aspect, the fuel cell system may further include a water-storage-amount acquisition portion configured to acquire an amount of the liquid water accumulated in the gas-liquid separator. In a normal operation state of the fuel cell system where the gas-liquid discharge valve is opened normally, in a case where the amount of the liquid water accumulated in the gas-liquid separator is a predetermined first liquid water amount or more, the controlling portion may execute a normal gas discharge process by controlling the anode gas supply system to supply the anode gas to the fuel cell and instructing the gas-liquid discharge valve to be opened. A pressure of the anode gas to be supplied to the fuel cell in the operation determination process may be higher than a pressure of the anode gas to be supplied to the fuel cell in the normal gas discharge process.

With this aspect, as the pressure of the anode gas to be supplied is higher, the discharge-gas flow rate of the anode offgas is higher. Accordingly, it is possible to shorten a time required for the normal-abnormality determination.

In the above aspect, the cathode gas supply-discharge system may further include a compressor provided in the cathode gas supply passage. The gas-liquid discharge passage may be connected to the cathode gas discharge passage. The controlling portion may control an operation of the compressor so that a flow rate of the cathode gas flowing through the cathode gas discharge passage in the operation determination process is larger than a flow rate of the cathode gas flowing through the cathode gas discharge passage in the normal gas discharge process.

With this aspect, even in a case where the amount of the anode offgas to be discharged from the gas-liquid discharge valve increases, the anode offgas can be surely diluted by the cathode gas.

In the above aspect, after the controlling portion determines, in the operation determination process, that the gas-liquid discharge valve is not opened normally, the controlling portion may execute a warm-up operation to raise a temperature of the fuel cell. The controlling portion may execute a restoration determination on whether or not an operation of the gas-liquid discharge valve is restored to normal, at least during execution of the warm-up operation or after the execution of the warm-up operation. The restoration determination may be executed, after the controlling portion instructs the gas-liquid discharge valve to be opened, such that, when the discharge-gas flow rate of the anode offgas is a predetermined restoration reference value or more, the controlling portion may determine that the operation of the gas-liquid discharge valve is restored to normal, and when the discharge-gas flow rate of the anode offgas is lower than the predetermined restoration reference value, the controlling portion may determine that the operation of the gas-liquid discharge valve is not restored to normal.

With this aspect, when the temperature of the fuel cell is raised by the warm-up operation, the gas-liquid discharge valve can be heated by use of heat from the fuel cell. Hereby, in a case where the gas-liquid discharge valve does not operate normally due to freezing, the frozen gas-liquid discharge valve can be defrosted, so that the operation of the gas-liquid discharge valve can be restored to normal. Further, by executing the restoration determination, it is possible to check whether the operation of the gas-liquid discharge valve is restored or not.

In the above aspect, the fuel cell system may further include a water-storage-amount acquisition portion configured to acquire an amount of the liquid water accumulated in the gas-liquid separator. In a normal operation state of the fuel cell system where the gas-liquid discharge valve is opened normally, when the amount of the liquid water accumulated in the gas-liquid separator reaches a predetermined first liquid water amount or more, the controlling portion may execute a normal gas discharge process by instructing the gas-liquid discharge valve to be opened. In a pre-restoration state of the fuel cell system before the operation of the gas-liquid discharge valve is restored to normal, when the amount of the liquid water accumulated in the gas-liquid separator reaches at least a second liquid water amount smaller than the first liquid water amount, the controlling portion may execute a restoration gas discharge process by instructing the gas-liquid discharge valve to be opened. The controlling portion may execute the restoration determination after the controlling portion instructs the gas-liquid discharge valve to be opened in the restoration gas discharge process.

With this aspect, when the liquid water reaches at least the second liquid water amount smaller than the first liquid water amount, the controlling portion executes the restoration gas discharge process. Hereby, the number of execution times of the restoration gas discharge process can be increased, thereby making it possible to increase the number of instruction times to instruct to the gas-liquid discharge valve to be opened. Accordingly, it is possible to increase the frequency of the restoration determination, thereby making it possible to prevent delay of the restoration after-process.

In the above aspect, the fuel cell system may further include a pressure sensor configured to measure a pressure inside the anode gas supply passage. The flow-rate acquisition portion may calculate the discharge-gas flow rate of the anode offgas by use of a change of the pressure measured by the pressure sensor. In a case where the restoration determination is performed, the controlling portion may execute at least any of the following processes: a first pre-process of increasing a pressure of the anode gas to be supplied to the fuel cell to be higher than a pressure of the anode gas to be supplied to the fuel cell during the execution of the normal gas discharge process; a second pre-process of decreasing a flow rate of the anode offgas to be circulated from the anode gas circulation passage to the anode gas supply passage to be lower than a flow rate of the anode offgas to be circulated from the anode gas circulation passage to the anode gas supply passage during the execution of the normal gas discharge process; and a third pre-process of decreasing a current value of the fuel cell to be smaller than a current value of the fuel cell during the execution of the normal gas discharge process.

With this aspect, when at least any one of the first pre-process to the third pre-process is executed, a possibility that the pressure measured by the pressure sensor changes due to an element other than the anode offgas to be discharged from the gas-liquid discharge valve can be reduced. This can further improve calculation accuracy of the discharge-gas flow rate, thereby making it possible to more accurately execute the restoration determination.

In the above aspect, the cathode gas supply-discharge system may include a compressor configured to send the cathode gas toward the cathode gas discharge passage. The gas-liquid discharge passage may be connected to the cathode gas discharge passage. The controlling portion may control an operation of the compressor so that a flow rate of the cathode gas flowing through the cathode gas discharge passage at a time when the restoration determination is executed is larger than a flow rate of the cathode gas flowing through the cathode gas discharge passage in the normal gas discharge process.

With this aspect, even in a case where the amount of the anode offgas to be discharged from the gas-liquid discharge valve increases, the anode offgas can be surely diluted by the cathode gas.

In the above aspect, in a case where an accumulated amount of the anode offgas discharged from the gas-liquid discharge passage within a predetermined period is a predetermined reference accumulated amount or more after the controlling portion instructs the gas-liquid discharge valve to be opened after the controlling portion determines, in the normal-abnormality determination, that the gas-liquid discharge valve is not opened normally, but before the restoration determination is executed, even when the discharge-gas flow rate of the anode offgas is less than the normal reference value, the controlling portion may determine that the gas-liquid discharge valve is opened normally.

With this aspect, the determination on whether or not the gas-liquid discharge valve is opened normally is executed by two determination methods, i.e., a method using the discharge-gas flow rate of the anode offgas and a method using the gas discharge amount of the anode offgas. Hereby, it is possible to more accurately perform the determination on whether or not the gas-liquid discharge valve is opened normally.

This disclosure is achievable in various forms other than the above aspects. For example, the disclosure is achievable in forms such as a control method of a fuel cell system and a vehicle including a fuel cell system.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. First Embodiment

Figure 1:
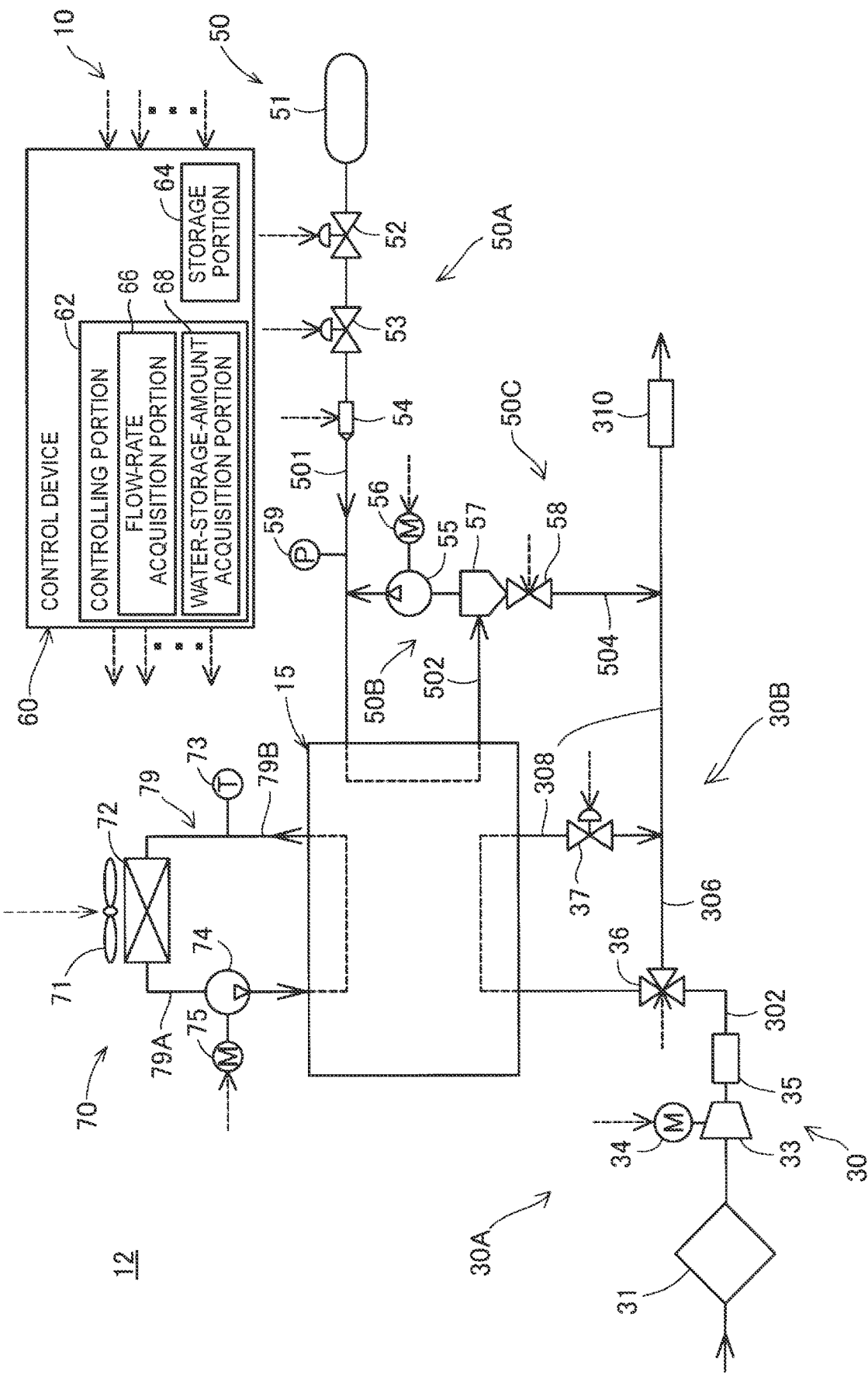
FIG. 1 is an explanatory view illustrating the outline of a fuel cell system in a first embodiment.

FIG. 1 is an explanatory view illustrating the outline of a fuel cell system 10 according to a first embodiment. The fuel cell system 10 of the present embodiment is provided in a fuel cell vehicle 12, for example, and is used as a power generator configured to drive a driving motor for the fuel cell vehicle 12. The fuel cell system 10 includes a fuel cell 15, a cathode gas supply-discharge system 30, an anode gas supply-discharge system 50, a refrigerant circulatory system 70, and a control device 60.

The control device 60 includes a controlling portion 62 and a storage portion 64. The controlling portion 62 controls an operation of the fuel cell system 10 by executing various programs stored in the storage portion 64. For example, the controlling portion 62 executes an operation determination process including a normal-abnormality determination on whether an operation of a gas-liquid discharge valve 58 (described later) is normal or not. In the storage portion 64, various thresholds to be used for the operation determination process and the like are stored other than the various programs.

The fuel cell 15 is a solid polymer fuel cell configured to generate electric power by an electrochemical reaction of oxygen and hydrogen upon receipt of supply of cathode gas and anode gas as reactant gases. In the present embodiment, the cathode gas is air, and the anode gas is hydrogen gas. The fuel cell 15 has a stack structure in which a plurality of single cells is laminated. Each of the single cells is a power generation element that can also generate electric power by itself. The single cell includes a membrane electrode assembly and two separators between which the membrane electrode assembly is sandwiched. The membrane electrode assembly includes an electrolyte membrane, an anode disposed on a first surface of the electrolyte membrane, and a cathode disposed on a second surface of the electrolyte membrane. The electrolyte membrane is a solid polymer thin film exhibiting an excellent proton conductivity in a wet condition in which water is included in the electrolyte membrane. An outer peripheral end of the single cell is provided with manifolds (not shown) for the reactant gases, the manifolds extending in the laminating direction of the single cells and branched to be connected to a power generation portion of the single cell. The single cells are fastened in a state sandwiched in the laminating direction in a laminated state.

The cathode gas supply-discharge system 30 supplies the cathode gas to the fuel cell 15 and discharges the cathode gas to the outside. The cathode gas supply-discharge system 30 includes a cathode gas supply system 30A and a cathode gas discharge system 30B. The cathode gas supply system 30A supplies the cathode gas to the fuel cell 15. The cathode gas supply system 30A includes a cathode gas supply passage 302, an air cleaner 31, a compressor 33, a motor 34, an intercooler 35, and a flow dividing valve 36.

The cathode gas supply passage 302 is placed on the upstream side from the fuel cell 15 and is a pipe via which the outside of the fuel cell system 10 communicates with the cathode of the fuel cell 15. The air cleaner 31 is provided on the upstream side from the compressor 33 in the cathode gas supply passage 302 and is configured to remove foreign matter in the cathode gas to be supplied to the fuel cell 15. The compressor 33 is provided in the cathode gas supply passage 302 placed on the upstream side from the fuel cell 15 and is configured to emit compressed air to the cathode in response to an instruction from the controlling portion 62. The compressor 33 is driven by the motor 34 operating in response to an instruction from the controlling portion 62. The intercooler 35 is provided on the downstream side from the compressor 33 in the cathode gas supply passage 302. The intercooler 35 cools down the cathode gas that is compressed by the compressor 33 and reaches a high temperature. The flow dividing valve 36 is a three-way valve, for example, and is configured such that, when an opening degree of the flow dividing valve 36 is adjusted, a flow rate of the cathode gas flowing toward the fuel cell 15 from the cathode gas supply passage 302 and a flow rate of the cathode gas flowing through a bypass passage 306 that branches off from the cathode gas supply passage 302 and detours around the fuel cell 15 are adjusted. The bypass passage 306 is connected to a cathode gas discharge passage 308 (described later). The cathode gas flowing through the bypass passage 306 is discharged to the outside via the cathode gas discharge passage 308.

The cathode gas discharge system 30B discharges the cathode gas to the outside. The cathode gas discharge system 30B includes the cathode gas discharge passage 308, the bypass passage 306, and a pressure control valve 37. The cathode gas discharge passage 308 is a pipe via which the cathode gas discharged from the fuel cell 15 (hereinafter also referred to as "cathode offgas") and the cathode gas flowing through the bypass passage 306 are to be discharged to the outside. The pressure control valve 37 adjusts its opening degree to adjust a back pressure of a cathode side passage of the fuel cell 15. The pressure control valve 37 is placed on the upstream side from a point, in the cathode gas discharge passage 308, to which the bypass passage 306 is connected. A muffler 310 is placed in a downstream end of the cathode gas discharge passage 308.

The anode gas supply-discharge system 50 includes an anode gas supply system 50A, an anode gas circulatory system 50B, and an anode gas discharge system 50C.

The anode gas supply system 50A supplies the anode gas to the fuel cell 15. The anode gas supply system 50A includes an anode gas tank 51, an anode gas supply passage 501, an on-off valve 52, a regulator 53, an injector 54, and a pressure sensor 59. In the anode gas tank 51, a high-pressure hydrogen gas is accumulated, for example. The anode gas supply passage 501 is connected to the anode gas tank 51 and the fuel cell 15 and is a pipe through which the anode gas directed from the anode gas tank 51 to the fuel cell 15 flows. When the on-off valve 52 is in a valve open state, the anode gas in the anode gas tank 51 flows toward the downstream side. The regulator 53 adjusts a pressure of the anode gas on the upstream side from the injector 54 based on a control by the controlling portion 62. The injector 54 is placed on the upstream side from a junction with an anode gas circulation passage 502 (described later) in the anode gas supply passage 501. The injector 54 is an on-off valve driven electromagnetically in accordance with a driving period or a valve opening time set by the controlling portion 62 and is configured to adjust an anode gas supply amount to be supplied to the fuel cell 15. The pressure sensor 59 measures an internal pressure (a supply pressure of the anode gas) on the downstream side from the injector 54 in the anode gas supply passage 501. A measurement result is transmitted to the control device 60.

The anode gas circulatory system 50B circulates the anode gas discharged from the fuel cell 15 (also referred to as "anode offgas") to the anode gas supply passage 501 again. The anode gas circulatory system 50B includes the anode gas circulation passage 502, a gas-liquid separator 57, a circulating pump 55, and a motor 56. The anode gas circulation passage 502 is connected to the fuel cell 15 and the anode gas supply passage 501 and is a pipe through which anode offgas directed to the anode gas supply passage 501 flows. The gas-liquid separator 57 is provided in the anode gas circulation passage 502 and is configured to separate liquid water from the anode offgas in which the liquid water is mixed. The circulating pump 55 drives the motor 56 so as to circulate the anode offgas in the anode gas circulation passage 502 toward the anode gas supply passage 501.

The anode gas discharge system 50C discharges the anode offgas or the liquid water generated by power generation of the fuel cell 15 to the outside. The anode gas discharge system 50C includes a gas-liquid discharge passage 504 and the gas-liquid discharge valve 58. The gas-liquid discharge passage 504 is a pipe via which a discharge port of the gas-liquid separator 57 from which the liquid water is discharged communicates with the outside.

The gas-liquid discharge valve 58 is placed in the gas-liquid discharge passage 504 and is configured to open and close the gas-liquid discharge passage 504. A diaphragm valve is used as the gas-liquid discharge valve 58, for example. In a normal operation state of the fuel cell system 10 for which it is determined that the gas-liquid discharge valve 58 is opened normally, the controlling portion 62 instructs the gas-liquid discharge valve 58 to be opened at a predetermined timing and controls the injector 54 to be opened and closed so that the anode gas is supplied to the downstream side (a normal gas discharge process). Hereby, the gas-liquid discharge valve 58 enters an open state, so that nitrogen gas that is an impurity gas included in the anode offgas and the liquid water are discharged to the outside via the gas-liquid discharge passage 504. The predetermined timing is a timing when the liquid water in the gas-liquid separator 57 is accumulated by a predetermined first liquid water amount or more, for example. Note that, in the normal gas discharge process, the circulating pump 55 may be driven or may be stopped.

The refrigerant circulatory system 70 adjusts the temperature of the fuel cell 15 by use of a refrigerant. As the refrigerant, water or an antifreeze solution such as ethylene glycol is used. The refrigerant circulatory system 70 includes a refrigerant circulation passage 79, a refrigerant circulating pump 74, a motor 75, a radiator 72, a radiator fan 71, and a temperature sensor 73.

The refrigerant circulation passage 79 includes a refrigerant supply passage 79A and a refrigerant discharge passage 79B. The refrigerant supply passage 79A is a pipe via which the refrigerant is supplied to the fuel cell 15. The refrigerant discharge passage 79B is a pipe via which the refrigerant is discharged from the fuel cell 15. The refrigerant circulating pump 74 sends the refrigerant in the refrigerant supply passage 79A to the fuel cell 15 by driving of the motor 75. The radiator 72 cools down the refrigerant flowing inside the radiator 72 by dissipating heat by wind sent from the radiator fan 71. The temperature sensor 73 measures a temperature of the refrigerant in the refrigerant discharge passage 79B. A measurement result of the temperature of the refrigerant is transmitted to the controlling portion 62.

The controlling portion 62 includes a flow-rate acquisition portion 66 and a water-storage-amount acquisition portion 67 functioning by execution of programs stored in the storage portion 64. The flow-rate acquisition portion 66 acquires a discharge-gas flow rate of the anode offgas discharged from the gas-liquid discharge valve 58 by use of a change of a pressure acquired from the pressure sensor 59. A calculation method of the discharge-gas flow rate will be described later. The water-storage-amount acquisition portion 67 acquires an amount of the liquid water accumulated in the gas-liquid separator 57. In the present embodiment, the water-storage-amount acquisition portion 67 may calculate an amount of liquid water generated by the fuel cell 15 by use of a power generation amount of the fuel cell 15 and estimate the calculated amount of the liquid water as a water storage amount. Further, in another embodiment, at least one water level sensor may be placed in the gas-liquid separator 57, so that the water storage amount is acquired based on a detection signal from the water level sensor. The water level sensor is placed in accordance with a threshold of the water storage amount to be used for a control by the controlling portion 62, for example. For example, in a case where the normal gas discharge process is executed at the time when the water storage amount is the first liquid water amount or more, the water level sensor is placed at a position corresponding to the first liquid water amount.

Figure 2:
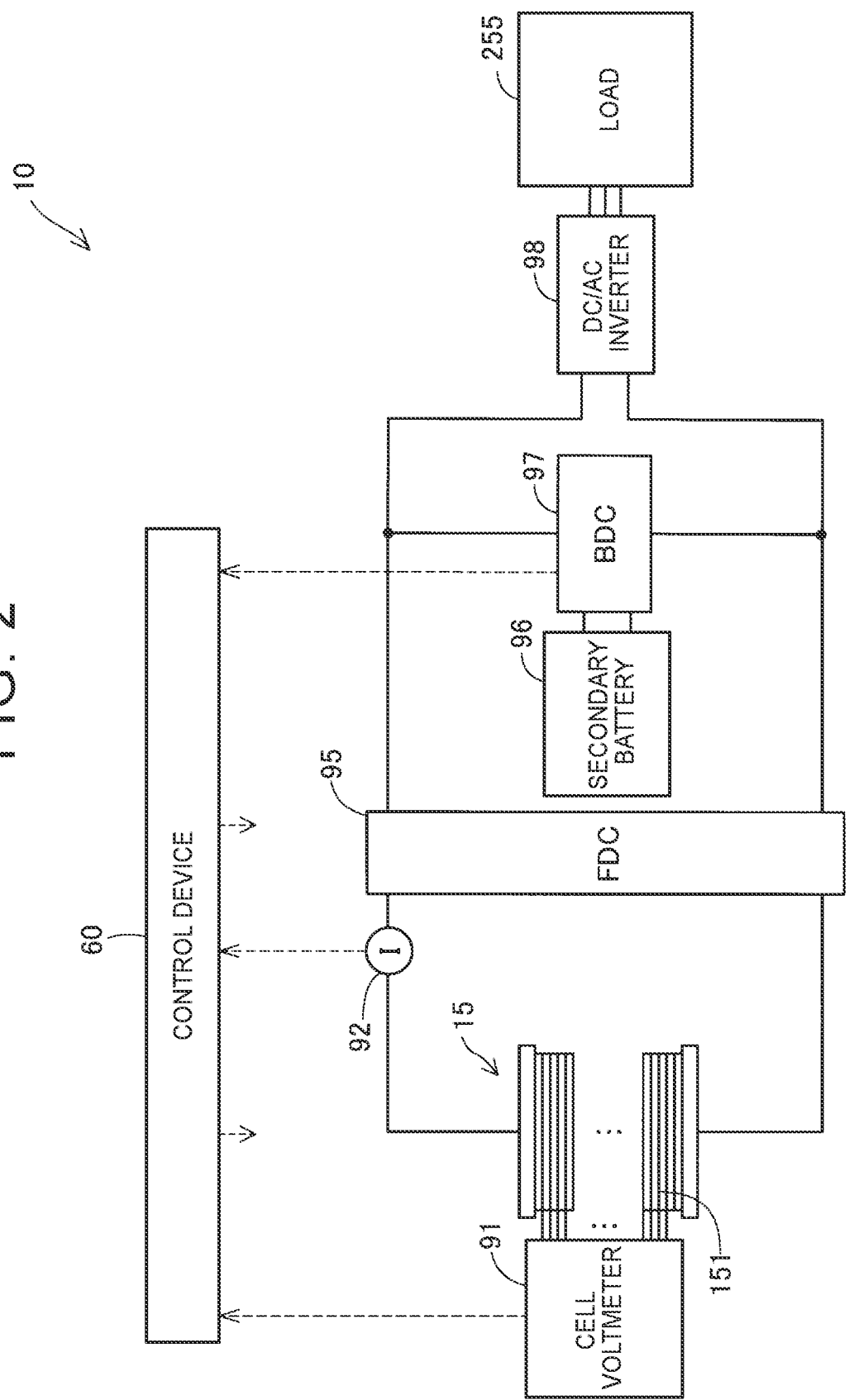
FIG. 2 is a schematic diagram illustrating an electrical configuration of the fuel cell system.

FIG. 2 is a schematic diagram illustrating an electrical configuration of the fuel cell system 10. The fuel cell system 10 includes an FDC 95, a DC/AC inverter 98, a cell voltmeter 91, and a current sensor 92.

The cell voltmeter 91 is connected to all single cells 151 of the fuel cell 15 and measures respective cell voltages of all the single cells 151. The cell voltmeter 91 transmits measurement results to the control device 60. The current sensor 92 measures a value of an output current from the fuel cell 15 and transmits it to the control device 60.

The FDC 95 is a circuit configured as a DC/DC converter. The FDC 95 controls an output voltage of the FDC 95 based on a voltage command value transmitted from the control device 60. Further, the FDC 95 controls an output current from the fuel cell 15 based on a current command value transmitted from the control device 60. The current command value is a value serving as a target value for the output current from the fuel cell 15 and is set by the control device 60. The control device 60 generates the current command value by calculating a request current value by use of a request power amount for the fuel cell 15, for example.

The DC/AC inverter 98 is connected to the fuel cell 15 and a load 255. The DC/AC inverter 98 converts a direct-current power output from the fuel cell 15 into an alternating-current power and supplies it to the load 255.

The fuel cell system 10 further includes a secondary battery 96 and a BDC 97. The secondary battery 96 is constituted by a nickel-metal hydride battery or a lithium ion battery, for example, and functions as an auxiliary power supply. Further, the secondary battery 96 performs supply of electric power to the fuel cell 15 and charging of power generated by the fuel cell 15 or regenerative power.

The BDC 97 is a circuit configured as a DC/DC converter similarly to the FDC 95 and controls charge and discharge of the secondary battery 96 in response to an instruction from the control device 60 as a controlling portion. The BDC 97 measures a state of charge (SOC) of the secondary battery 96 and transmits it to the control device 60.

Figure 3:
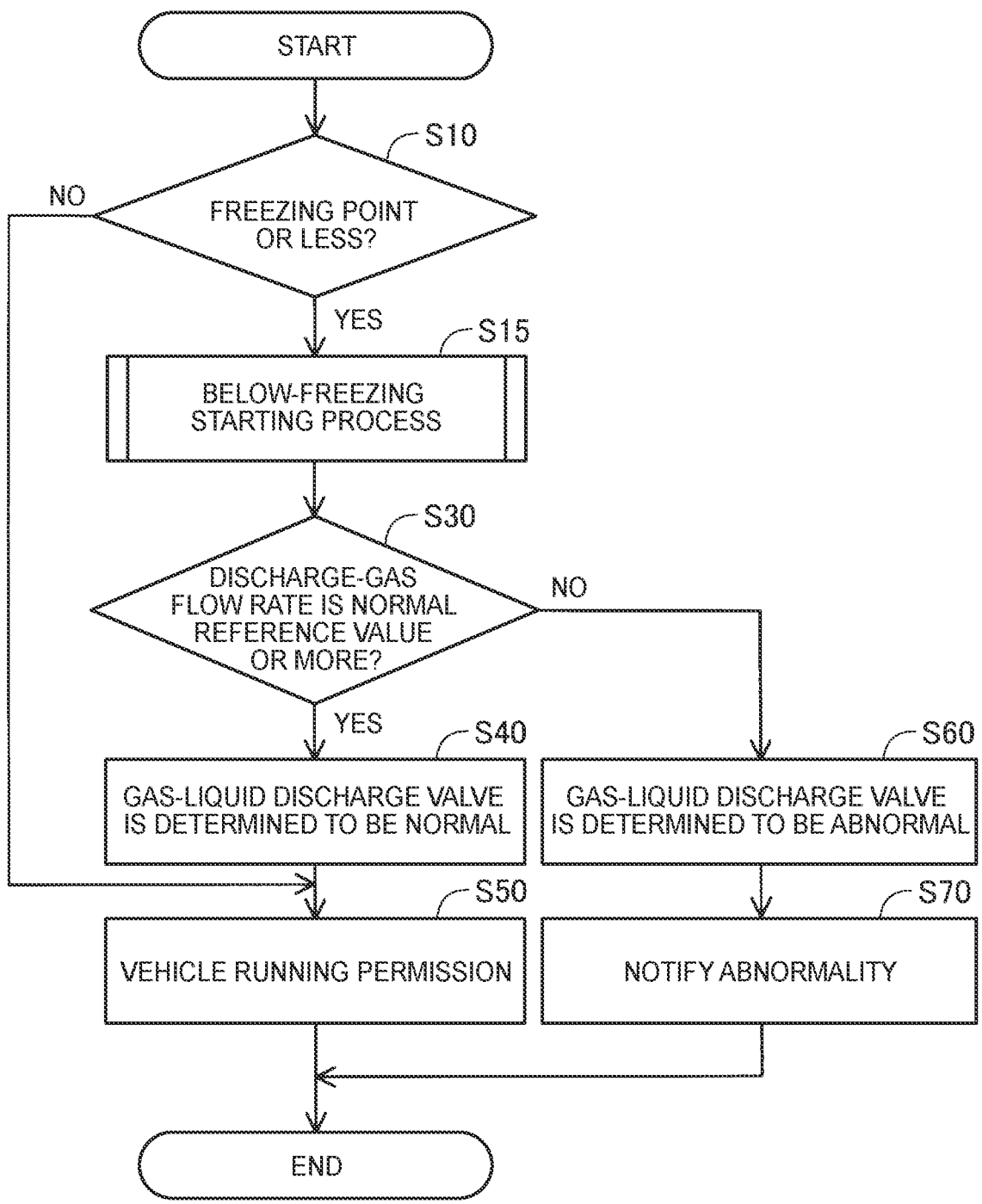
FIG. 3 is a flowchart including an operation determination process of a gas-liquid discharge valve.
Figure 4:
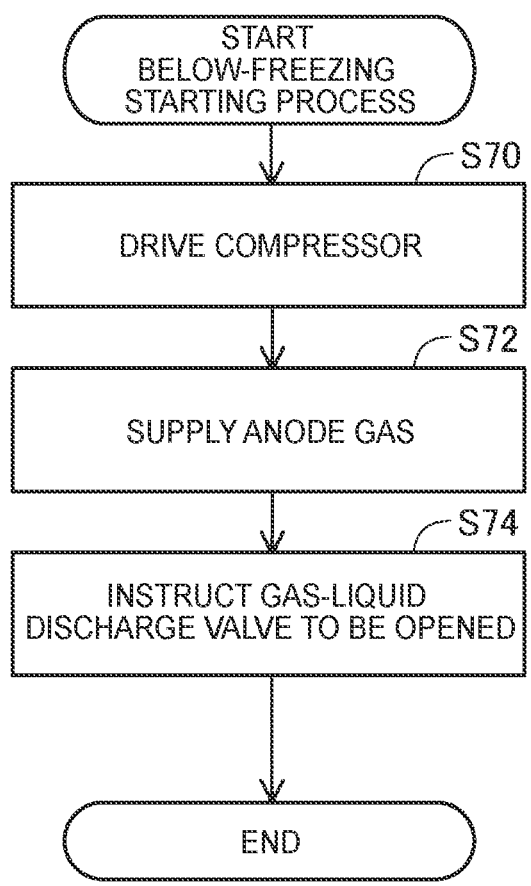
FIG. 4 is a flowchart of a below-freezing starting process.
Figure 5:
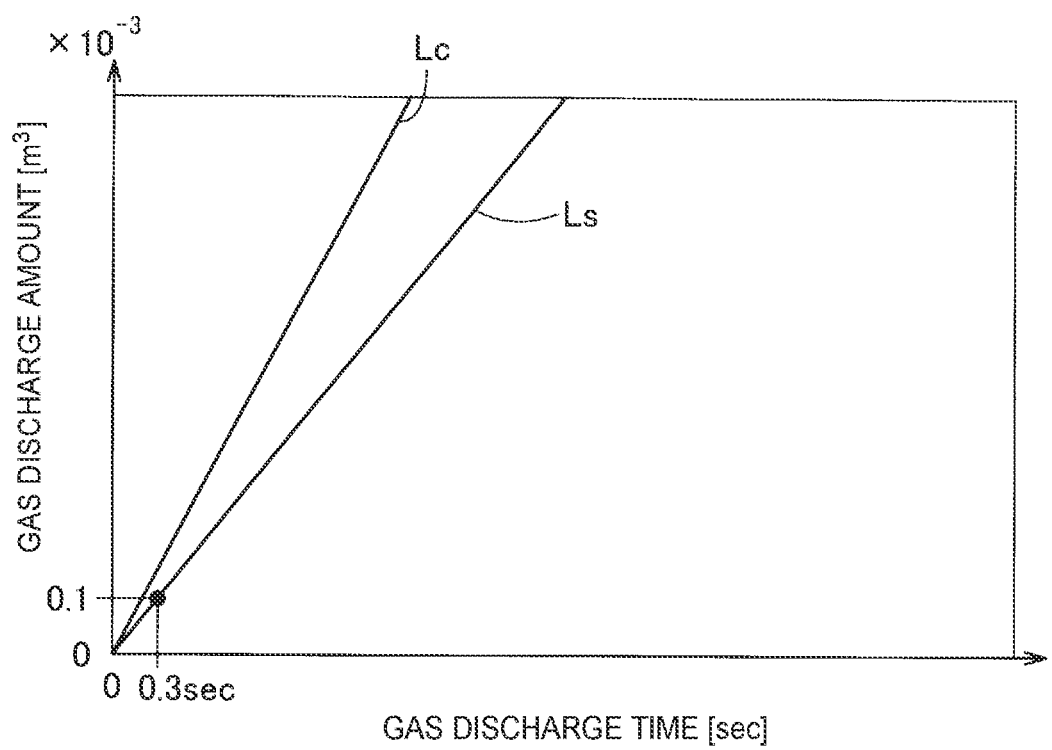
FIG. 5 is a graph illustrating a characteristic in an open state of the gas-liquid discharge valve.

FIG. 3 is a flowchart including the operation determination process for the gas-liquid discharge valve 58. FIG. 4 is a flowchart of a below-freezing starting process. FIG. 5 is a graph illustrating a characteristic in an open state of the gas-liquid discharge valve 58. In the graph of FIG. 5, the vertical axis indicates a gas discharge amount of the anode offgas discharged from the gas-liquid discharge valve 58, and the horizontal axis indicates an elapsed time. The operation determination process illustrated in FIG. 3 is executed at a startup timing at which a start switch of the fuel cell vehicle 12 is turned on and the fuel cell system 10 receives an activation instruction. Further, the operation determination process may be executed at a predetermined timing after the startup timing.

As illustrated in FIG. 3, the controlling portion 62 determines whether or not an environmental temperature that is a temperature under an environment where the fuel cell system 10 is placed is a freezing point or lower (step S10). In the present embodiment, the environmental temperature is a refrigerant temperature, in the refrigerant discharge passage 79B, acquired by the temperature sensor 73 (FIG. 1) that is a temperature acquisition portion. Note that, in other embodiments, the environmental temperature may be an outside temperature or may be a temperature of the gas-liquid discharge valve 58. The outside temperature can be acquired by placing an outside temperature sensor, for example. The temperature of the gas-liquid discharge valve 58 can be acquired by placing a temperature sensor in the gas-liquid discharge valve 58, for example.

When the controlling portion 62 determines "No" in step S10, the controlling portion 62 notifies a driver of a vehicle running permission (step S50). In step S50, information indicating that the fuel cell vehicle 12 is in a drivable state is displayed on an in-vehicle monitor or the like of the fuel cell vehicle 12, so that the vehicle running permission is notified to the driver. Meanwhile, when the controlling portion 62 determines "Yes" in step S10, the controlling portion 62 executes a below-freezing starting process (step S15). The below-freezing starting process is a process of securing a request power generation amount of the fuel cell 15 even when freezing occurs in the fuel cell 15.

As illustrated in FIG. 4, in the below-freezing starting process, the controlling portion 62 drives the compressor 33 (step S70). Subsequently, the controlling portion 62 controls opening and closing of the injector 54 so as to supply the anode gas to the fuel cell 15 (step S72). In step S72, while the anode gas is supplied to the fuel cell 15, the circulating pump 55 stops so that the inside of the anode of the fuel cell 15 is replaced with the anode gas. Further, the controlling portion 62 instructs the gas-liquid discharge valve 58 to be opened (step S74). The below-freezing starting process continues until a supply amount of the anode gas to the anode of the fuel cell 15 reaches the capacity of the anode or more, the supply amount being calculated by use of a pressure value measured by the pressure sensor 59.

In the below-freezing starting process, when the gas-liquid discharge valve 58 is instructed to be opened, the controlling portion 62 determines whether or not the discharge-gas flow rate of the anode offgas from the gas-liquid discharge valve 58 is a predetermined normal reference value or more (step S30 in FIG. 3). In step S30, the discharge-gas flow rate of the anode offgas and the predetermined normal reference value may be both expressed as mass flow rates and compared with each other or may be both expressed as volume flow rates and compared with each other.

The normal reference value is stored in the storage portion 64. As illustrated in FIG. 5, the normal reference value Ls [$m^3$/sec] is set to be a value lower than a designed value Lc [$m^3$/sec] of the discharge-gas flow rate at the time when the gas-liquid discharge valve 58 is in a valve open state. The designed value Lc is a value obtained at the time when a valve opening rate of the gas-liquid discharge valve 58 is 100%. The valve opening rate is a percentage (%) of an actual passage sectional area of the gas-liquid discharge valve 58 with respect to a passage sectional area of the gas-liquid discharge valve 58 at the time when the gas-liquid discharge valve 58 enters an open state as designed without any abnormality. The normal reference value Ls is set to a discharge-gas flow rate that can reach a target gas discharge amount (an accumulated value) of the anode offgas in the normal gas discharge process at the time when a predetermined time has elapsed after the controlling portion 62 instructs the gas-liquid discharge valve 58 to be opened at a target supply pressure of the anode gas. For example, the normal reference value Ls is set to a discharge-gas flow rate at the time when the valve opening rate of the gas-liquid discharge valve 58 is 50%. In the present embodiment, in a case where the valve opening rate is 50%, when the temperature of the fuel cell 15 (in the present embodiment, a measured value of the temperature sensor 73) is 0° C. and a target supply pressure of the anode gas is 100 kPa, the target gas discharge amount of the anode offgas in the normal gas discharge process is 0.1 L. The predetermined time is determined in consideration of an extra time until a measured value of the pressure sensor 59 becomes stable in addition to a time required to reach the target gas discharge amount of 0.1 L, when the valve opening rate of the gas-liquid discharge valve 58 is 50%, for example. In the present embodiment, the predetermined time is 0.3 sec, for example. That is, the normal reference value Ls is set to a discharge-gas flow rate of 0.1 L/0.3 sec. The normal reference value Ls may be changed in accordance with the temperature of the fuel cell 15 and the target supply pressure of the anode gas.

The discharge-gas flow rate of the anode offgas is acquired by the flow-rate acquisition portion 66 included in the fuel cell system 10. In the present embodiment, the flow-rate acquisition portion is constituted by the pressure sensor 59 and the controlling portion 62. The controlling portion 62 acquires the discharge-gas flow rate of the anode gas by calculation using Equations (1) to (4) as follows.

$$Pv = f(Q_{in} - Q_{crs} - Q_{FC} - Q_{ex}) \quad (1)$$

Here, Pv indicates a pressure decrease speed [Pa/sec], of the anode gas in the anode gas supply passage 501, that is found by differentiating a measured value (pressure) of the pressure sensor 59 by time, $Q_{in}$ indicates a supply flow rate [m$^3$/sec] of the anode gas to be supplied to the downstream side from the injector 54, $Q_{crs}$ indicates a hydrogen permeation speed [m$^3$/sec] from the anode to the cathode in the fuel cell 15, $Q_{FC}$ indicates an anode gas speed [m$^3$/sec] of the anode gas consumed by power generation of the fuel cell 15, $Q_{ex}$ indicates a discharge-gas flow rate [m$^3$/sec] of the anode gas to be discharged from the gas-liquid discharge valve 58, and f indicates a function. $Q_{in}$, $Q_{crs}$, $Q_{FC}$ are expressed by a volume flow rate [m$^3$/sec] of gas in a standard state. $Q_{in}$ is calculated by an orifice equation by use of a pressure difference between the downstream side and the upstream side of the passage across the injector 54. The determination in step S30 illustrated in FIG. 3 is preferably executed while the operation of the injector 54 stops, that is, during a close operation. In this case, "0" is substituted in $Q_{in}$. $Q_{crs}$ is calculated based on a hydrogen partial pressure difference between the anode and the cathode. When the determination in step S30 is performed, $Q_{crs}$ may be considered to be "0" because the permeation hydrogen speed is very small.

$Q_{FC}$ is calculated by Equation (2) as follows.

$$Q_{FC} = (I/F) \times (1/2) \times N \times 22.4 \times 10^{-3} \quad (2)$$

Here, I indicates a measured current value [A] by the current sensor 92, F indicates the Faraday constant, and N is the number of laminations of the single cells 151. Here, 22.4×10$^{-3}$ is a volume [m$^3$/mol] per 1 mol of gas in a standard state.

When "0" is substituted in $Q_{in}$ and "0" is substituted in $Q_{crs}$ in Equation (1), Equation (3) is derived, and Equation (4) is derived from Equation (3) as follows.

$$Pv = f(-Q_{FC} - Q_{ex}) \quad (3)$$

$$Q_{ex} = [\{V \times (Pv/Ps) \times (273/(273+T))\}] - Q_{FC} \quad (4)$$

In Equation (4), V indicates a volume [m$^3$] at which the anode gas can flow on the downstream side from the injector 54 in a closed state of the gas-liquid discharge valve 58 and is a total volume of a part of the anode gas supply passage 501 on the downstream side from the injector 54, a manifold through which the anode gas of the fuel cell 15 flows, the anode gas circulation passage 502, and the gas-liquid separator 57. Further, in Equation (4), Ps indicates a standard pressure and is 101.3 kPa in the present embodiment. Further, T indicates an environmental temperature [° C.] of an environment in which the fuel cell system 10 is placed and is a measured value (degree Celsius) of the temperature sensor 73 in the present embodiment.

The controlling portion 62 calculates the discharge-gas flow rate $Q_{ex}$ by substituting Equation (2) in Equation (4). Here, when the fuel cell 15 does not generate electric power, $Q_{FC}$ is "0."

As illustrated in FIG. 3, the controlling portion 62 compares the discharge-gas flow rate $Q_{ex}$ of the anode offgas with the normal reference value and performs a normal-abnormality determination on whether the gas-liquid discharge valve 58 is opened normally or not, by determining whether or not the discharge-gas flow rate $Q_{ex}$ is at least the normal reference value (step S30). More specifically, in 0.3 seconds after step S74 in FIG. 4 is executed, when a value obtained by multiplying the discharge-gas flow rate calculated by Equation (4) by 0.3 seconds is a reference amount (for example, 0.1 L) or more, it is determined to be "Yes" in step S30 in FIG. 3. In this case, the controlling portion 62 makes a normal determination that the gas-liquid discharge valve 58 is opened normally (step S40). That is, after the controlling portion 62 instructs the gas-liquid discharge valve 58 to be opened, when the discharge-gas flow rate $Q_{ex}$ of the anode gas from the gas-liquid discharge valve 58 is at least the predetermined normal reference value, the controlling portion 62 makes a normal determination. The controlling portion 62 executes step S50 after step S40.

Meanwhile, when the discharge-gas flow rate $Q_{ex}$ of the anode offgas is less than the normal reference value, the controlling portion 62 makes an abnormality determination that the gas-liquid discharge valve 58 is not opened normally (step S60). That is, after the controlling portion 62 instructs the gas-liquid discharge valve 58 to be opened, when the discharge-gas flow rate $Q_{ex}$ of the anode gas from the gas-liquid discharge valve 58 is less than the predetermined normal reference value, the controlling portion 62 makes an abnormality determination. In this case, the controlling portion 62 proceeds to step S70 so as to notify the driver that the gas-liquid discharge valve 58 has an abnormality and finishes the operation determination process without executing a vehicle running permission.

Figure 6:
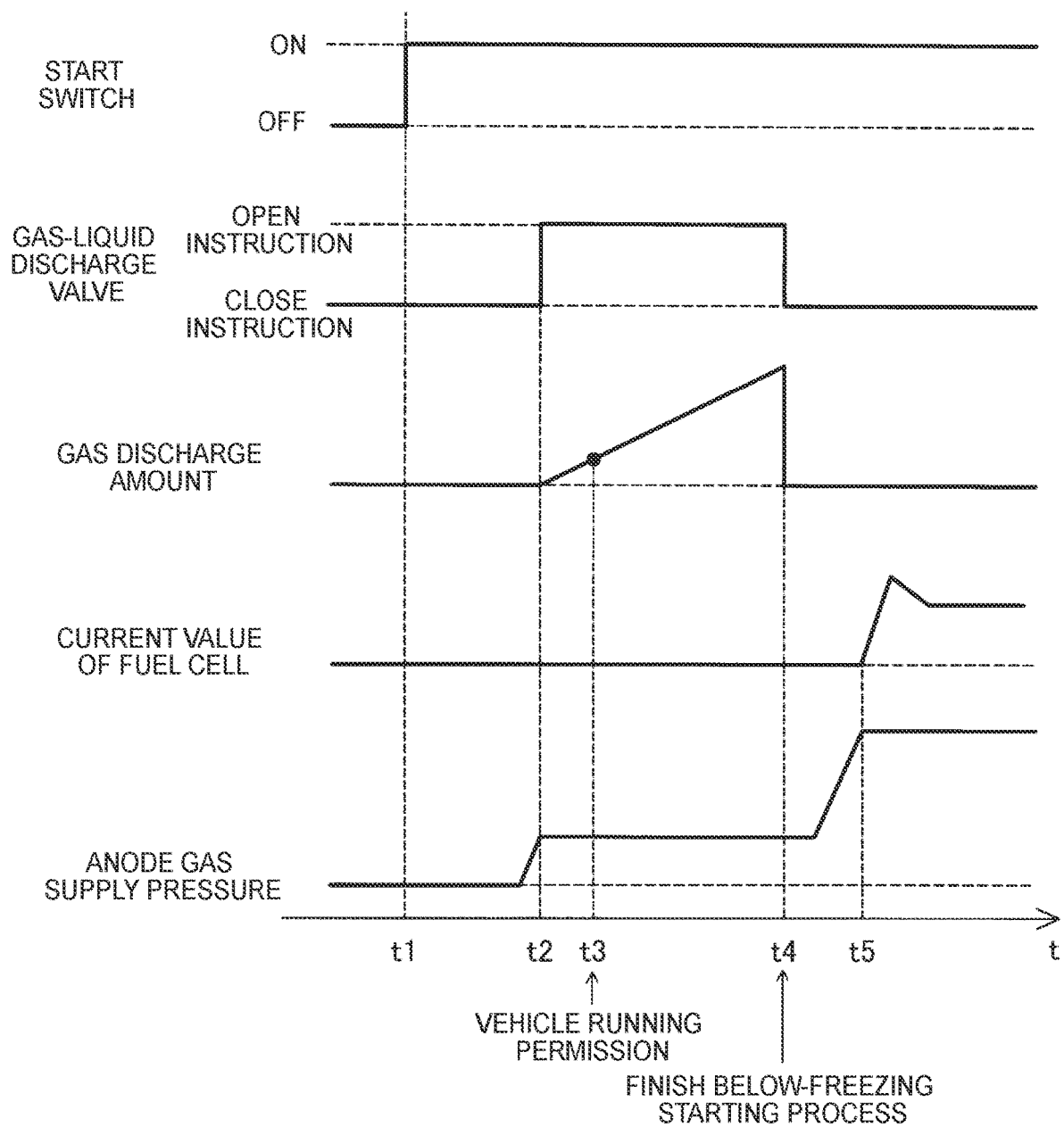
FIG. 6 is a timing chart of various processes, including the operation determination process, executed by a controlling portion.

FIG. 6 is a timing chart of various processes, including the operation determination process, executed by the controlling portion 62. When the start switch is turned on at time t1, and when a temperature acquired from the temperature sensor 73 is below the freezing point, the below-freezing starting process is executed. When the below-freezing starting process is started and the anode gas supply pressure reaches a predetermined target pressure at time t2, the controlling portion 62 instructs the gas-liquid discharge valve 58 to be opened. When a predetermined time (e.g., 0.3 seconds) has passed after the gas-liquid discharge valve 58 is instructed to be opened at time t2, the controlling portion 62 executes the normal-abnormality determination in step S30 illustrated in FIG. 3. When the gas-liquid discharge valve 58 is determined to be normal at time t3, the controlling portion 62 notifies a vehicle running permission. When the inside of the anode of the fuel cell 15 has been completely replaced with the anode gas at time t4, the below-freezing starting process is finished. After the below-freezing starting process is finished, the controlling portion 62 further increases the supply pressure of the anode gas. When a current of a threshold or more flows by applying a voltage to the fuel cell 15 at the time when the supply pressure of the anode gas reaches a predetermined target pressure at time t5, it is determined that the fuel cell 15 can generate electric power normally. Hereby, running of the fuel cell vehicle 12 by use of the power generation of the fuel cell 15 is executed.

As described above, in the first embodiment, the controlling portion 62 executes the normal-abnormality determination on the gas-liquid discharge valve 58 by use of the discharge-gas flow rate $Q_{ex}$, thereby making it possible to accurately perform the normal-abnormality determination on whether or not the gas-liquid discharge valve 58 is opened normally. For example, it is possible to accurately make a determination that the gas-liquid discharge valve 58 is not opened normally for a reason other than freezing. Further, for example, by performing the normal-abnormality determination by use of the discharge-gas flow rate, it is possible to accurately make a determination that the gas-liquid discharge valve 58 is not opened normally due to freezing.

Further, in the first embodiment, when the gas-liquid discharge valve 58 is instructed to be opened in the below-freezing starting process, the normal-abnormality determination is executed. That is, when the normal-abnormality determination is executed during the execution of the below-freezing starting process, the normal-abnormality determination can be executed by use of the below-freezing starting process. Hereby, the controlling portion 62 does not need to instruct the gas-liquid discharge valve 58 to be opened in order to perform the normal-abnormality determination independently from the below-freezing starting process.

Note that, in the first embodiment, the controlling portion 62 may control the operation of the injector 54 so that a pressure (a determination-time pressure) of the anode gas to be supplied to the fuel cell 15 in the operation determination process is set to be higher than a pressure (a normal-time pressure) of the anode gas to be supplied to the fuel cell 15 in the normal gas discharge process. The discharge-gas flow rate of the anode offgas from the gas-liquid discharge valve 58 is calculated by use of a decrease speed (Pv) of the pressure of the anode gas. Accordingly, as the pressure of the anode gas to be supplied to the fuel cell 15 is higher, an influence by other pressure fluctuation noises can be relatively lowered. Hereby, the controlling portion 62 can perform the normal-abnormality determination more accurately. Further, as the pressure of the anode gas to be supplied is higher, the discharge-gas flow rate of the anode offgas is higher. Accordingly, it is possible to shorten a time required for the normal-abnormality determination. Note that the determination-time pressure may be 110% of the normal-time pressure or more or may be 120% of the normal-time pressure or more. An upper limit of the determination-time pressure is set to be less than an upper limit pressure that is an upper limit below which various components of the anode gas supply-discharge system 50 are not damaged. Here, as the pressure of the anode gas to be supplied to the fuel cell 15, an average of values measured by the pressure sensor 59 is used, for example.

Further, in a case where the determination-time pressure is set to be higher than the normal-time pressure, the controlling portion 62 may set a flow rate (a determination-time cathode gas flow rate) of the cathode gas flowing through the cathode gas discharge passage 308 to be larger than a flow rate (a normal-time cathode gas flow rate) of the cathode gas flowing through the cathode gas discharge passage 308 in the normal gas discharge process. Hereby, the anode offgas can be diluted by the cathode gas, so that a possibility that gas having a high hydrogen-gas concentration is discharged to the outside can be reduced. The flow rate of the cathode gas flowing through the cathode gas discharge passage 308 can be made large by increasing a rotation number of the compressor 33, for example. Further, the determination-time cathode gas flow rate may be 110% of the normal-time cathode gas flow rate or more or may be 120% of the normal-time cathode gas flow rate or more.

B. Second Embodiment

Figure 7:
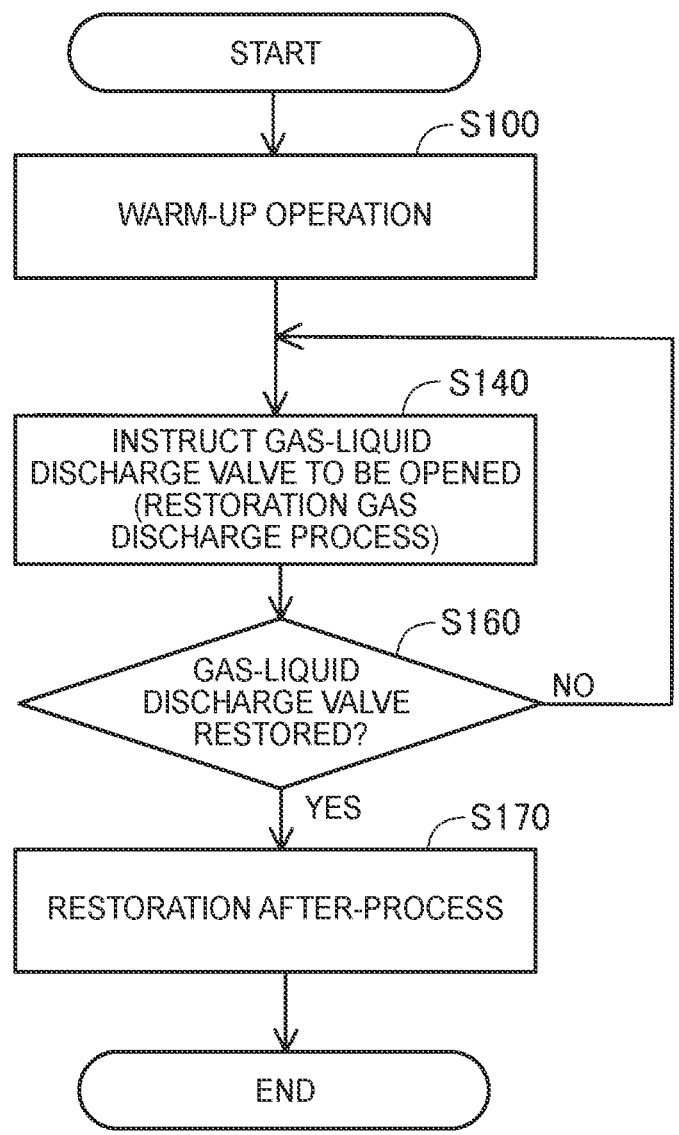
FIG. 7 is another flowchart executed by the control device of the fuel cell system according to a second embodiment.

FIG. 7 is another flowchart executed by the control device 60 of the fuel cell system 10. The flowchart illustrated in FIG. 7 is executed after the gas-liquid discharge valve 58 is determined to have an abnormality in step S60 in FIG. 3. Note that the flowchart illustrated in FIG. 7 may be executed before or after step S70 in FIG. 3 or may be executed instead of step S70.

First, the controlling portion 62 executes a warm-up operation that is a process to cancel the abnormality (step S100). The warm-up operation is executed only for a predetermined time. When the temperature of the fuel cell 15 is raised by the warm-up operation, the gas-liquid discharge valve 58 placed around the fuel cell 15 is heated by use of heat from the fuel cell 15. Hereby, in a case where the gas-liquid discharge valve 58 does not operate normally due to freezing, the frozen gas-liquid discharge valve 58 can be defrosted, so that the operation of the gas-liquid discharge valve 58 can be restored to normal. The warm-up operation includes a normal warm-up operation and a rapid warm-up operation, and either of the operations may be executed. The rapid warm-up operation is an operation in which a cathode-gas stoichiometry ratio that is a ratio of a supply amount of the cathode gas with respect to a theoretical supply amount of the cathode gas that is theoretically found by use of the power generation amount of the fuel cell 15 is made lower than that in a normal operation of the fuel cell system 10 for which it is determined that the gas-liquid discharge valve 58 is opened normally. In the normal operation, the cathode-gas stoichiometry ratio is set to around 1.5 to 2.0. On the other hand, in the rapid warm-up operation, the cathode-gas stoichiometry ratio is set to a value close to 1.0, e.g., around 0.9 to 1.1. The warm-up operation is an operation in which the cathode gas stoichiometry ratio is higher than that in the rapid warm-up operation, and the cathode gas stoichiometry ratio is at the same level as the normal operation.

Subsequently, the controlling portion 62 instructs the gas-liquid discharge valve 58 to be opened so as to perform a restoration gas discharge process at a predetermined timing during the warm-up operation or after the warm-up operation (step S140). The predetermined timing is a timing when the liquid water is accumulated in the gas-liquid separator 57 by the first liquid water amount or more, for example.

Subsequently, the controlling portion 62 executes a restoration determination on whether or not the operation of the gas-liquid discharge valve 58 is restored to normal (step S160). More specifically, when the discharge-gas flow rate $Q_{ex}$ of the anode offgas from the gas-liquid discharge valve 58 is a predetermined restoration reference value or more, the controlling portion 62 determines that the operation of the gas-liquid discharge valve 58 is restored to normal. That is, the controlling portion 62 determines that the frozen gas-liquid discharge valve 58 is defrosted by the warm-up operation. In the meantime, when the discharge-gas flow rate $Q_{ex}$ is less than the predetermined restoration reference value, the controlling portion 62 determines that the operation of the gas-liquid discharge valve 58 is not restored to normal. That is, the controlling portion 62 determines that the frozen gas-liquid discharge valve 58 is not defrosted by the warm-up operation. The discharge-gas flow rate $Q_{ex}$ is calculated by use of Equation (1) to Equation (4), similarly to the first embodiment. The restoration reference value may be set to the same value as the normal reference value in the first embodiment or may be set to a value lower than the normal reference value. The determination in step S160 is executed, for example, when only a predetermined restoration determination time has elapsed after the process of step S140 is executed. The restoration determination time is a time until the discharge-gas flow rate $Q_{ex}$ becomes stable and is set to 0.5 seconds, for example. That is, in step S160, it is determined whether or not a value obtained by multiplying the discharge-gas flow rate $Q_{ex}$ by a restoration elapsed time when the restoration determination time has elapsed is at least a value obtained by multiplying, by the restoration elapsed time, a discharge-gas flow rate estimated from a valve opening rate at the time when the restoration reference value is determined.

When the controlling portion 62 determines "Yes" in step S160, the controlling portion 62 executes a restoration after-process (step S170). At a startup timing before the start switch of the fuel cell system 10 is turned on and a vehicle running permission is made, the restoration after-process is a process of notifying the driver of the vehicle running permission or a process of allowing the fuel cell 15 to generate electric power. Further, at the time when the start switch is turned off and the fuel cell system 10 is stopped, the restoration after-process is a process of stopping driving of the compressor 33.

In the meantime, when the controlling portion 62 determines "No" in step S160, the controlling portion 62 executes step S140 again.

The second embodiment yields the following effects in addition to the effects of the first embodiment. That is, in the second embodiment, when the temperature of the fuel cell 15 is raised by the warm-up operation, the gas-liquid discharge valve 58 can be heated by use of heat from the fuel cell 15. Hereby, in a case where the gas-liquid discharge valve 58 is not opened normally due to freezing, the frozen gas-liquid discharge valve 58 can be defrosted, so that the operation of the gas-liquid discharge valve 58 can be restored to normal. Further, by executing the restoration determination, it is possible to check whether the operation of the gas-liquid discharge valve 58 is restored or not.

C. Third Embodiment

Figure 8:
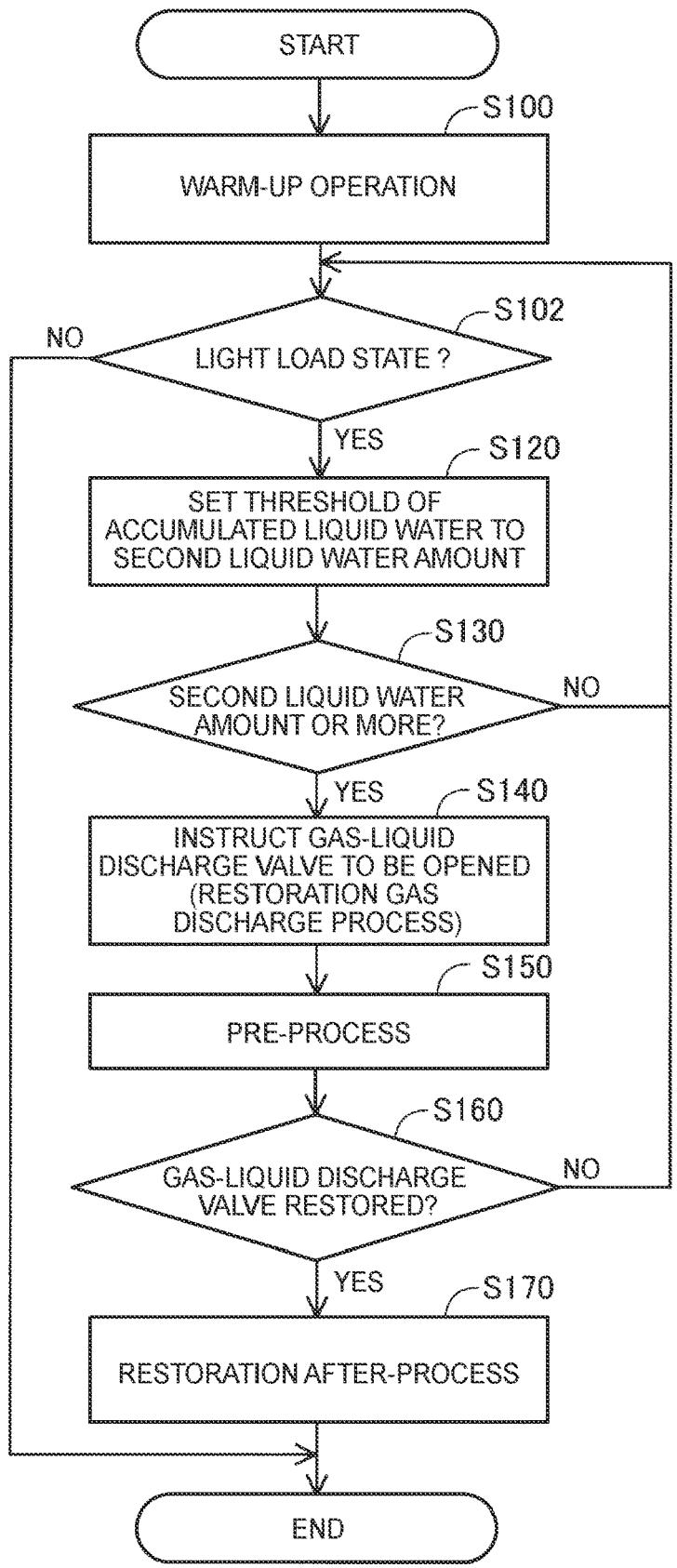
FIG. 8 is another flowchart executed by the control device of the fuel cell system according to a third embodiment.

FIG. 8 is another flowchart executed by the control device 60 of the fuel cell system 10. The flowchart illustrated in FIG. 8 is executed after the gas-liquid discharge valve 58 is determined to have an abnormality in step S60 in FIG. 3. Note that the flowchart illustrated in FIG. 8 may be executed before or after step S70 in FIG. 3 or may be executed instead of step S70. Further, the same reference sign is given to a step similar to a step in the flowchart (FIG. 7) of the second embodiment, and a description thereof is omitted.

First, the controlling portion 62 executes a warm-up operation that is a process of canceling the abnormality (step S100). After the warm-up operation is completed, the controlling portion 62 determines whether or not the fuel cell system 10 is in an operating state with a light load (step S102). The operating state with a light load indicates a state where a load connected to the fuel cell 15 is a predetermined value (e.g., 2 kilowatts) or less, e.g., in an idling operation during stop of the fuel cell vehicle 12.

When the controlling portion 62 determines "No" in step S102, the controlling portion 62 finishes the process of the flowchart.

Meanwhile, when the controlling portion 62 determines "Yes" in step S102, the controlling portion 62 sets a threshold of the liquid water accumulated in the gas-liquid separator 57 to a second liquid water amount (step S120). The threshold serves as a trigger to instruct the gas-liquid discharge valve 58 to be opened. The second liquid water amount is an amount smaller than the first liquid water amount that serves as a trigger to the normal gas discharge process. In a process after an abnormality determination is made, when the liquid water accumulated in the gas-liquid separator 57 reaches the second liquid water amount or more, the controlling portion 62 instructs the gas-liquid discharge valve 58 to be opened. The second liquid water amount is preferably 20% of the first liquid water amount or less, more preferably, 10% of the first liquid water amount or less, for example. Hereby, the frequency at which the gas-liquid discharge valve 58 is instructed to be opened can be increased, thereby making it possible to increase the number of times of the restoration determination (described later).

Subsequently, the controlling portion 62 determines whether or not the amount of the liquid water accumulated in the gas-liquid separator 57 reaches the second liquid water amount or more (step S130). When the controlling portion 62 determines "No" in step S130, the controlling portion 62 executes step S102 again. Meanwhile, when the controlling portion 62 determines "Yes" in step S130, the controlling portion 62 instructs the gas-liquid discharge valve 58 to be opened so as to execute the restoration gas discharge process (step S140).

Subsequently, the controlling portion 62 executes a pre-process to more accurately perform the restoration determination (described later) (step S150). Note that the order of step S140 and step S150 may be reversed to the above. The pre-process includes at least one of the following processes.

First pre-process: The pressure of the anode gas to be supplied to the fuel cell 15 is made higher than that during the execution of the normal gas discharge process.

Second pre-process: A flow rate of the anode offgas to be circulated to from the anode gas circulation passage 502 to the anode gas supply passage 501 is made smaller than that during the execution of the normal gas discharge process.

Third pre-process: A current value of the fuel cell 15 is set to be smaller than that during the execution of the normal gas discharge process.

In the first pre-process, for example, the controlling portion 62 shortens a valve opening interval of the injector 54 than that during the execution of the normal gas discharge process or lengthens a valve opening time thereof. The supply pressure of the anode offgas in the first pre-process may be at least 110% of the supply pressure of the anode gas during the execution of the normal gas discharge process or may be at least 120% of the supply pressure of the anode gas during the execution of the normal gas discharge process. An upper limit of the supply pressure of the anode gas in the first pre-process is set to be less than the upper limit pressure that is the upper limit below which various components of the anode gas supply-discharge system 50 are not damaged.

In the second pre-process, the controlling portion 62 stops the driving of the circulating pump 55 so as to decrease the flow rate of the anode offgas to be circulated to the anode gas supply passage 501, for example. In the third pre-process, the controlling portion 62 sets the current value as a current command value to zero, for example.

In step S150, when at least one of the first pre-process to the third pre-process is executed, the controlling portion 62 may execute the following fourth pre-process.

Fourth pre-process: The flow rate of the cathode gas flowing through the cathode gas discharge passage 308 is made larger than the flow rate of the cathode gas flowing through the cathode gas discharge passage 308 in the normal gas discharge process.

In the fourth pre-process, the controlling portion 62 increases the cathode gas flow rate by increasing the rotation number of the compressor 33, for example. Further, the cathode gas flow rate in the fourth pre-process may be at least 110% of the cathode gas flow rate in the normal gas discharge process or may be at least 120% of the cathode gas flow rate in the normal gas discharge process. Even in a case where an amount of the anode offgas to be discharged to the outside via the gas-liquid discharge valve 58 is increased due to the first pre-process, the second pre-process, or the third pre-process, when the fourth pre-process is executed, hydrogen gas in the anode offgas can be diluted by the cathode offgas. Hereby, a possibility that gas having a high hydrogen-gas concentration is discharged to the outside via the cathode gas discharge passage 308 can be reduced.

Subsequently to step S150, the controlling portion 62 executes the restoration determination on whether or not the operation of the gas-liquid discharge valve 58 is restored to normal (step S160). When the controlling portion 62 determines "Yes" in step S160, the controlling portion 62 executes the restoration after-process (step S170).

In the meantime, when the controlling portion 62 determines "No" in step S160, the controlling portion 62 executes step S102 again.

Figure 9:
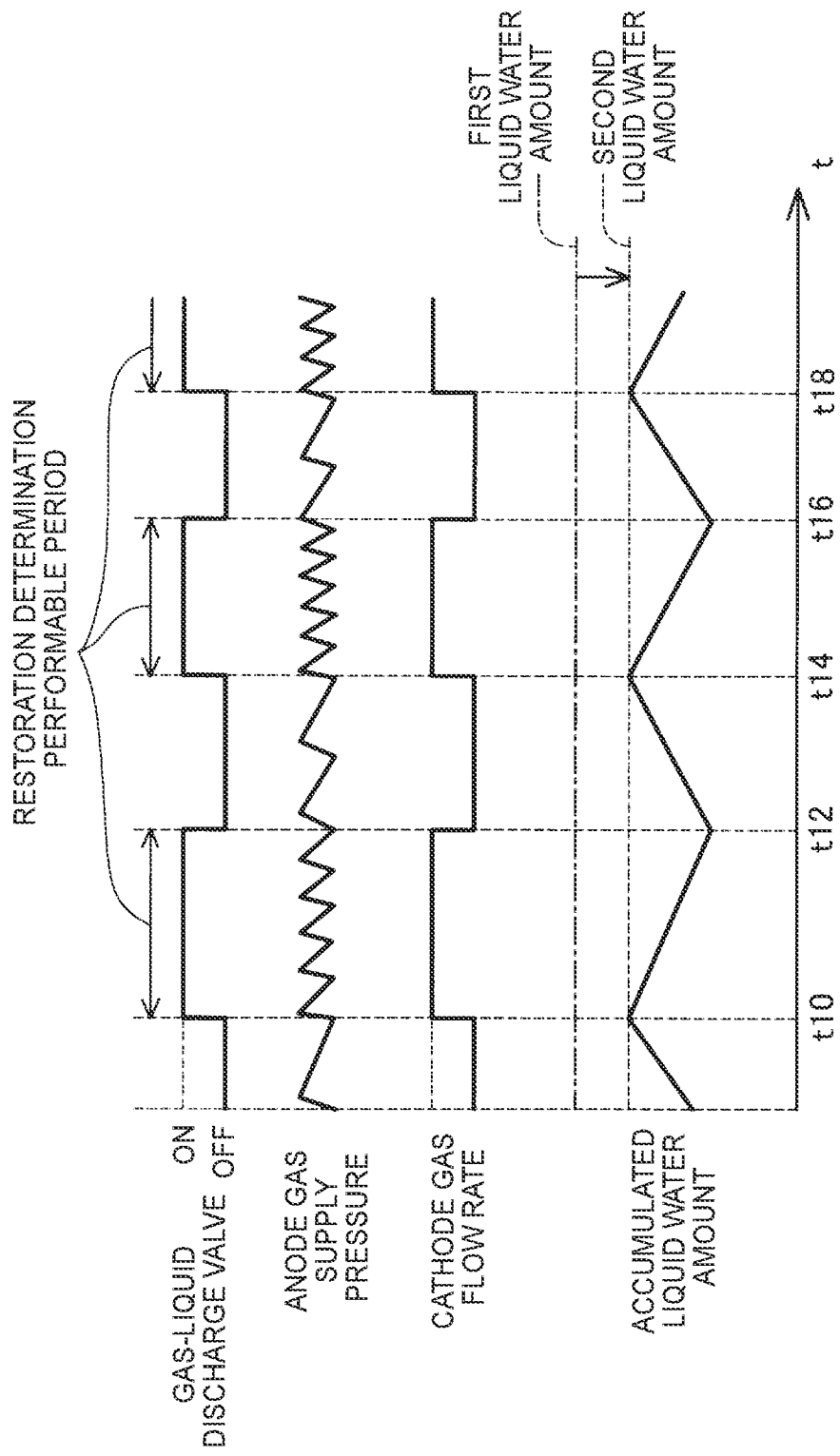
FIG. 9 is a timing chart of step S130, step S140, and step S160 shown in FIG. 8.

FIG. 9 is a timing chart of step S130, step S140, and step S160 illustrated in FIG. 8. When the liquid water accumulated in the gas-liquid separator 57, that is estimated from the power generation amount of the fuel cell 15, reaches the second liquid water amount or more (time t10, t14, t18), the controlling portion 62 instructs the gas-liquid discharge valve 58 to be opened. In a case where it is assumed that the gas-liquid discharge valve 58 operates normally, when the liquid water is discharged from the gas-liquid discharge valve 58 and the liquid water amount of the liquid water accumulated in the gas-liquid separator 57 reaches a predetermined value (e.g., zero) or below (time t12, t16), the controlling portion 62 instructs the gas-liquid discharge valve 58 to be closed. While the gas-liquid discharge valve 58 is instructed to be opened, the valve opening interval of the injector 54 is made shorter than that during the execution of the normal gas discharge process, so that the supply pressure of the anode gas is increased. Further, while the gas-liquid discharge valve 58 is instructed to be opened, the rotation number of the compressor 33 is made higher than that during the execution of the normal gas discharge process, so that the flow rate of the cathode gas flowing through the cathode gas discharge passage 308 is increased. The controlling portion 62 executes the restoration determination while the gas-liquid discharge valve 58 is instructed to be opened.

The third embodiment yields the following effects in addition to effects similar to those obtained in the first and second embodiments. That is, in a pre-restoration state of the fuel cell system 10 before the operation of the gas-liquid discharge valve 58 is restored to normal, that is, after a predetermined timing after it is determined that the gas-liquid discharge valve 58 is not opened normally in the operation determination process, the controlling portion 62 instructs the gas-liquid discharge valve 58 to be opened by the restoration gas discharge process (step S140 in FIG. 8). Further, while the gas-liquid discharge valve 58 is instructed to be opened in the restoration gas discharge process, the controlling portion 62 executes the restoration determination (step S160 in FIG. 8). Further, when the liquid water reaches at least the second liquid water amount smaller than the first liquid water amount, the controlling portion 62 executes the restoration gas discharge process. Hereby, the number of execution times of the restoration gas discharge process can be increased, thereby making it possible to increase the number of times to instruct to the gas-liquid discharge valve 58 to be opened. Accordingly, it is possible to increase the frequency of the restoration determination, thereby making it possible to prevent delay of the restoration after-process.

Further, in the third embodiment, when the restoration determination is performed, the controlling portion 62 executes the pre-process (step S150 in FIG. 8). The controlling portion 62 executes, as the pre-process, the first pre-process of increasing the pressure of the anode gas to be supplied to the fuel cell 15 to be higher than that during the execution of the normal gas discharge process, thereby yielding the following effects. That is, the discharge-gas flow rate $Q_{ex}$ of the anode offgas from the gas-liquid discharge valve 58 is calculated by use of the decrease speed (Pv) of the anode gas pressure. Accordingly, as the pressure of the anode gas to be supplied to the fuel cell 15 is higher, an influence by other pressure fluctuation noises can be relatively lowered. Hereby, the controlling portion 62 can perform the restoration determination more accurately. Further, as the pressure of the anode gas to be supplied is higher, the discharge-gas flow rate $Q_{ex}$ of the anode offgas is higher, thereby making it possible to shorten a time required for the restoration determination.

Further, the controlling portion 62 executes, as the pre-process, the second pre-process of decreasing the flow rate of the anode offgas to be circulated from the anode gas circulation passage 502 to the anode gas supply passage 501 to be smaller than that during the execution of the normal gas discharge process, thereby yielding the following effects. That is, by decreasing the flow rate of the circulating anode gas, a pressure pulsation in a region where the pressure sensor 59 is placed in the anode gas supply passage 501 can be restrained. This makes it possible to reduce a pressure fluctuation noise, thereby making it possible to perform the restoration determination more accurately.

Further, the controlling portion 62 executes, as the pre-process, the third pre-process of decreasing the current value of the fuel cell 15 to be smaller than that during the execution of the normal gas discharge process, thereby making it possible to yield the following effects. That is, as the current value of the fuel cell 15 becomes larger, a consumed amount, in the fuel cell 15, of the anode gas supplied to the fuel cell 15 increases. Accordingly, a pressure fluctuation noise of the pressure measured by the pressure sensor 59 becomes larger. Meanwhile, when the current value of the fuel cell 15 is set to be small by the third pre-process, the consumed amount of the anode gas in the fuel cell 15 can be reduced. This makes it possible to reduce the pressure fluctuation noise, thereby making it possible to perform the restoration determination more accurately.

As described above, when at least one of the first pre-process to the third pre-process is executed, a possibility that the pressure measured by the pressure sensor 59 changes due to an element other than the anode offgas to be discharged from the gas-liquid discharge valve 58 can be reduced. This can further improve calculation accuracy of the discharge-gas flow rate $Q_{ex}$, thereby making it possible to perform the restoration determination more accurately.

D. Fourth Embodiment

In the first embodiment to the third embodiment, when the discharge-gas flow rate $Q_{ex}$ is less than the normal reference value Ls, the controlling portion 62 determines that the gas-liquid discharge valve 58 has an abnormality. However, the embodiments are not limited to this. The following describes the content of another abnormality existence determination to be executed by the controlling portion 62, by use of the first embodiment.

Figure 10:
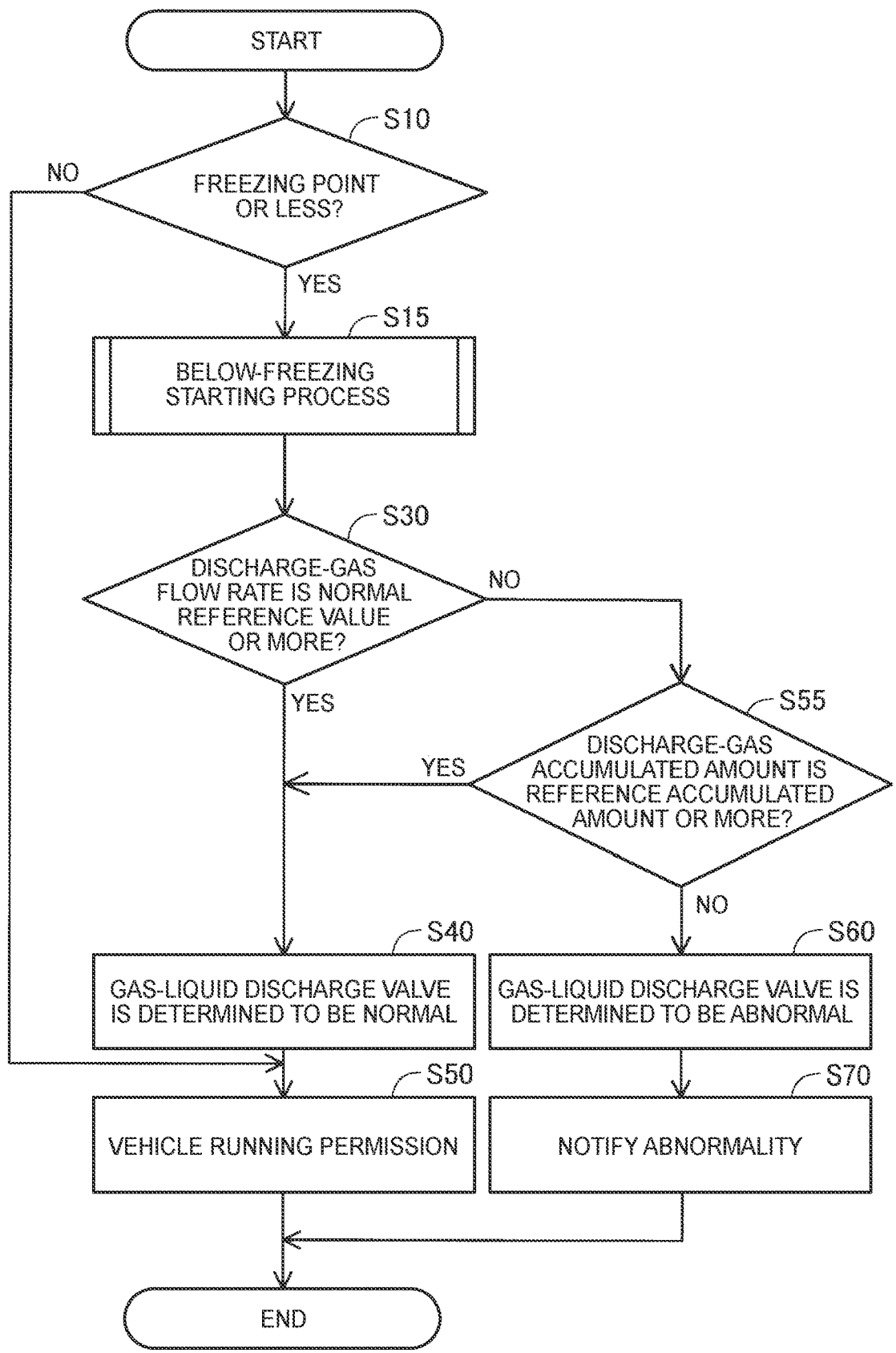
FIG. 10 is a flowchart of an abnormality existence determination in a fourth embodiment.
Figure 11:
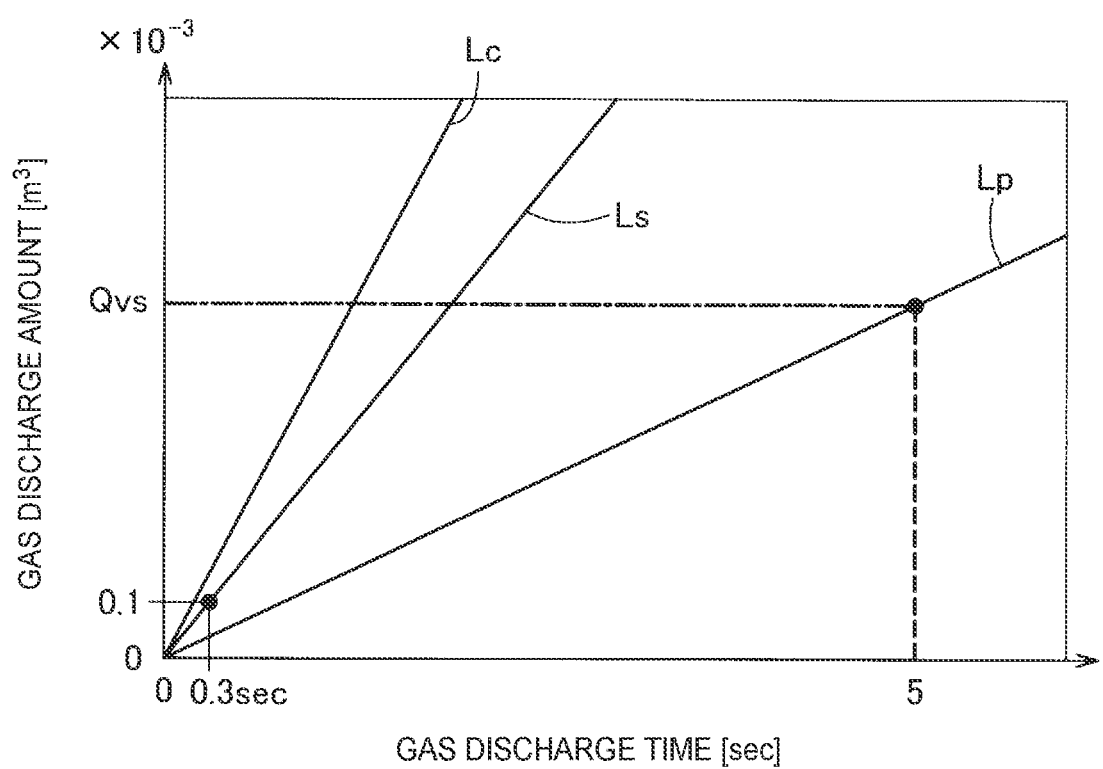
FIG. 11 is a view to describe a predetermined reference accumulated amount.

FIG. 10 is a flowchart of the abnormality existence determination in a fourth embodiment. The same reference sign is given to a step similar to a step in the flowchart in FIG. 3 in the first embodiment, and a description thereof is omitted. FIG. 11 is a view to describe a predetermined reference accumulated amount.

As illustrated in FIG. 10, when the controlling portion 62 determines "No" in step S30, that is, when the controlling portion 62 determines that the gas-liquid discharge valve 58 is not opened normally in the normal-abnormality determination process, the controlling portion 62 executes step S55. In step S55, the controlling portion 62 determines whether or not an accumulated amount of the anode offgas discharged from the gas-liquid discharge passage 504 within a predetermined period is at least a predetermined reference accumulated amount. In a case where the accumulated amount of the anode offgas is the predetermined reference accumulated amount or more, even when the discharge-gas flow rate $Q_{ex}$ is less than the normal reference value Ls, the controlling portion 62 determines that the gas-liquid discharge valve 58 is opened normally (step S40). Meanwhile, in a case where the accumulated amount of the discharged anode offgas is less than the predetermined reference accumulated amount, the controlling portion 62 determines that the gas-liquid discharge valve 58 does not operate normally (step S60).

The controlling portion 62 calculates the accumulated amount of the discharged anode offgas (a discharge-gas accumulated amount) by use of a pressure decrease amount of the anode gas measured by the pressure sensor 59 within a predetermined period (e.g., five seconds) longer than a determination period in step S30 during an OFF period of the injector 54. More specifically, the controlling portion 62 calculates the discharge-gas accumulated amount by use of Equation (5) as follows.

$$Qv_{ex}=[\{V\times(\Delta P/Ps)\times(273/(273+T)\}]-Qv_{FC} \quad (5)$$

Here, $Qv_{ex}$ indicates the discharge-gas accumulated amount. Further, V indicates a volume at which the anode gas can flow on the downstream side of the injector 54 in a closed state of the gas-liquid discharge valve 58 and is a total volume of a part of the anode gas supply passage 501 on the downstream side from the injector 54, the manifold through which the anode gas of the fuel cell 15 flows, the anode gas circulation passage 502, and the gas-liquid separator 57. $\Delta P$ indicates the pressure decrease amount of the anode gas measured by the pressure sensor 59 within the predetermined period. Further, Ps indicates a standard pressure and is 101.3 kPa in the present embodiment, and T indicates an environmental temperature of an environment in which the fuel cell system 10 is placed and is a measured value by the temperature sensor 73 in the present embodiment. $Qv_{FC}$ indicates an amount of the anode gas consumed by power generation of the fuel cell 15 within the predetermined period.

As illustrated in FIG. 11, the predetermined reference accumulated amount Qvs is calculated based on a discharge-gas flow rate Lp of the cathode offgas at the time when the valve opening rate of the gas-liquid discharge valve 58 is a value lower than a valve opening rate at the normal reference value Ls. More specifically, the reference accumulated amount Qvs is a value obtained by multiplying the discharge-gas flow rate Lp by the predetermined period (e.g., five seconds). The valve opening rate corresponding to the discharge-gas flow rate Lp may be set within a range in which the target gas discharge amount of the anode offgas in the normal gas discharge process can be achieved within the predetermined period. Hereby, in a case where the controlling portion 62 determines "Yes" in step S55, it is possible to restrain a time for execution of the subsequent normal gas discharge process from becoming longer.

In the fourth embodiment, the determination on whether or not the gas-liquid discharge valve 58 is opened normally is executed by two determination methods, i.e., a method using the discharge-gas flow rate of the anode offgas and a method using the gas discharge amount of the anode offgas. Hereby, it is possible to more accurately perform the determination on whether or not the gas-liquid discharge valve 58 is opened normally. For example, by setting the normal reference value Ls to a safe-side value, the controlling portion 62 determines, in step S30, whether or not the gas-liquid discharge valve 58 is opened normally, and when the gas-liquid discharge valve 58 is not opened normally, it is possible to determine whether or not the gas-liquid discharge valve 58 is opened normally again, by use of the reference accumulated amount Qvs.

E. Other Embodiments

E-1. Another Embodiment 1

In each of the above embodiments, when the temperature acquired by the temperature sensor 73 (FIG. 1) is the freezing point or lower, the controlling portion 62 performs the normal-abnormality determination on whether or not the gas-liquid discharge valve 58 operates normally (FIG. 3). However, the normal-abnormality determination may be also performed in other cases. For example, when the temperature acquired by the temperature sensor 73 (FIG. 1) is not the freezing point or lower, the controlling portion 62 may perform the normal-abnormality determination. Even in such a case, it is possible to accurately perform the determination on whether or not the gas-liquid discharge valve 58 operates normally.

E-2. Another Embodiment 2

In each of the above embodiments, the flow-rate acquisition portion is constituted by the controlling portion 62 and the pressure sensor 59, and the controlling portion 62 calculates the discharge-gas flow rate $Q_{ex}$ by use of a pressure acquired from the pressure sensor 59. However, the embodiments are not limited to this. A flow meter may be placed in the vicinity of an outlet of the gas-liquid discharge valve 58 in the gas-liquid discharge passage 504 so that the flow meter functions as the flow-rate acquisition portion.

E-3. Another Embodiment 3

In the third embodiment, the restoration reference value may be a discharge-gas flow rate of the cathode offgas at a valve opening rate that is lower than a valve opening rate at the normal reference value and is higher than a valve opening rate corresponding to the discharge-gas flow rate Lp.

E-4. Another Embodiment 4

In the second embodiment or the third embodiment, when the controlling portion 62 determines that the gas-liquid discharge valve 58 is not opened normally in the operation determination process, the controlling portion 62 executes the warm-up operation to raise the temperature of the fuel cell 15. However, these embodiments are not limited to this. The controlling portion 62 may execute a process to raise the temperature of the gas-liquid discharge valve 58 by use of other methods. For example, the controlling portion 62 may raise the temperature of the gas-liquid discharge valve 58 by heating by a heater.

Note that this disclosure is not limited to the above embodiments and includes various modifications. For example, the above embodiments are described in detail to describe the disclosure clearly and are not necessarily limited to one including all the configurations described above. Further, a part of the configuration of a given embodiment can be replaced with the configuration of any of the modifications, and the configuration of any of the modifications can be added to the configuration of a given embodiment. Further, addition, deletion, or replacement of any of other configurations can be performed on a part of the configuration of each of the embodiments. Further, the embodiments and the modifications may be combined with each other.

What is claimed is:

1. A fuel cell system comprising:
a fuel cell;
an anode gas supply system configured to supply anode gas to the fuel cell, the anode gas supply system including an anode gas supply passage through which the anode gas flows toward the fuel cell;
an anode gas circulatory system configured to circulate anode offgas discharged from the fuel cell to the anode gas supply passage, the anode gas circulatory system including
an anode gas circulation passage through which the anode offgas flows toward the anode gas supply passage, and
a gas-liquid separator provided in the anode gas circulation passage and configured to separate liquid water from the anode offgas;
a cathode gas supply-discharge system including
a cathode gas supply passage configured to supply cathode gas to the fuel cell, and
a cathode gas discharge passage through which cathode offgas discharged from the fuel cell is discharged to an outside of the fuel cell system;
a gas-liquid discharge passage connected to the gas-liquid separator;
a gas-liquid discharge valve provided in the gas-liquid discharge passage and configured to open and close the gas-liquid discharge passage;
a pressure sensor configured to measure a pressure inside the anode gas supply passage;
a temperature acquisition portion configured to acquire an environmental temperature of the fuel cell system,
a water-storage-amount acquisition portion configured to acquire an amount of the liquid water accumulated in the gas-liquid separator; and
a controlling portion configured to execute an operation determination process including a normal-abnormality determination on whether the gas-liquid discharge valve is opened normally or not, and programmed to:
calculate a discharge-gas flow rate of the anode offgas discharged from the gas-liquid separator by use of a change of the pressure measured by the pressure sensor,
in a case of receiving an activation instruction to activate the fuel cell system, when the environmental temperature is a freezing point or less, execute a below-freezing starting process by controlling the anode gas supply system to supply the anode gas to the fuel cell and instructing the gas-liquid discharge valve to be opened,
after instructing the gas-liquid discharge valve to be opened in the below-freezing starting process, execute the normal-abnormality determination,
when the calculated discharge-gas flow rate of the anode offgas is a predetermined normal reference value or more, determine that the gas-liquid discharge valve is opened normally, and when the calculated discharge-gas flow rate of the anode offgas is lower than the predetermined normal reference value, determine that the gas-liquid discharge valve is not opened normally,
after determining that the gas-liquid discharge valve is not opened normally, execute a warm-up operation to raise a temperature of the fuel cell,
execute a restoration determination on whether or not an operation of the gas-liquid discharge valve is restored to normal, at least during execution of the warm-up operation or after the execution of the warm-up operation, the restoration determination being executed, after instructing the gas-liquid discharge valve to be opened, such that when the calculated discharge-gas flow rate of the anode offgas is a predetermined restoration reference value or more, it is determined that the operation of the gas-liquid discharge valve is restored to normal, and when the calculated discharge-gas flow rate of the anode offgas is lower than the predetermined restoration reference value, it is determined that the operation of the gas-liquid discharge valve is not restored to normal,
wherein the controlling portion is further programmed to:
in a normal operation state of the fuel cell system where the gas-liquid discharge valve is opened normally, when the amount of the liquid water accumulated in the gas-liquid separator reaches a predetermined first liquid water amount or more, execute a normal gas discharge process by instructing the gas-liquid discharge valve to be opened,
in a pre-restoration state of the fuel cell system before the operation of the gas-liquid discharge valve is restored to normal, when the amount of the liquid water accumulated in the gas-liquid separator reaches at least a second liquid water amount smaller than the first liquid water amount, execute a restoration gas discharge process by instructing the gas-liquid discharge valve to be opened,
execute the restoration determination after instructing the gas-liquid discharge valve to be opened in the restoration gas discharge process,
in a case where the restoration determination is performed, execute at least any of the following processes:
a first pre-process of increasing a pressure of the anode gas to be supplied to the fuel cell to be higher than a pressure of the anode gas to be supplied to the fuel cell during the execution of the normal gas discharge process, a second pre-process of decreasing a flow rate of the anode offgas to be circulated from the anode gas circulation passage to the anode gas supply passage to be lower than a flow rate of the anode offgas to be circulated from the anode gas circulation passage to the anode gas supply passage during the execution of the normal gas discharge process; and a third pre-process of decreasing a current value of the fuel cell to be smaller than a current value of the fuel cell during the execution of the normal gas discharge process.

2. The fuel cell system according to claim 1, further comprising a water-storage-amount acquisition portion configured to acquire an amount of the liquid water accumulated in the gas-liquid separator, wherein:

in a normal operation state of the fuel cell system where the gas-liquid discharge valve is opened normally, in a case where the amount of the liquid water accumulated in the gas-liquid separator is a predetermined first liquid water amount or more, the controlling portion executes a normal gas discharge process by controlling the anode gas supply system to supply the anode gas to the fuel cell and instructing the gas-liquid discharge valve to be opened; and a pressure of the anode gas to be supplied to the fuel cell in the operation determination process is higher than a pressure of the anode gas to be supplied to the fuel cell in the normal gas discharge process.

3. The fuel cell system according to claim 2, wherein:

the cathode gas supply-discharge system further includes a compressor provided in the cathode gas supply passage;

the gas-liquid discharge passage is connected to the cathode gas discharge passage; and the controlling portion controls an operation of the compressor so that a flow rate of the cathode gas flowing through the cathode gas discharge passage in the operation determination process is larger than a flow rate of the cathode gas flowing through the cathode gas discharge passage in the normal gas discharge process.

4. The fuel cell system according to claim 1, wherein:

the cathode gas supply-discharge system includes a compressor configured to send the cathode gas toward the cathode gas discharge passage;

the gas-liquid discharge passage is connected to the cathode gas discharge passage; and the controlling portion controls an operation of the compressor so that a flow rate of the cathode gas flowing through the cathode gas discharge passage at a time when the restoration determination is executed is larger than a flow rate of the cathode gas flowing through the cathode gas discharge passage in the normal gas discharge process.

5. The fuel cell system according to claim 1, wherein:

in a case where an accumulated amount of the anode offgas discharged from the gas-liquid discharge passage within a predetermined period is a predetermined reference accumulated amount or more after the controlling portion instructs the gas-liquid discharge valve to be opened after the controlling portion determines, in the normal-abnormality determination, that the gas-liquid discharge valve is not opened normally, but before the restoration determination is executed, even when the discharge-gas flow rate of the anode offgas is less than the normal reference value, the controlling portion determines that the gas-liquid discharge valve is opened normally.

* * * * *